United States Patent
Kubota et al.

(10) Patent No.: US 11,028,921 B2
(45) Date of Patent: Jun. 8, 2021

(54) ARRANGEMENT STRUCTURE OF GEAR POSITION DETECTING SENSOR

(71) Applicant: HONDA MOTOR CO., LTD., Tokyo (JP)

(72) Inventors: Daisuke Kubota, Wako (JP); Hayato Yoshida, Wako (JP); Masaki Yamazaki, Wako (JP); Shinichiro Keyaki, Wako (JP); Yasuaki Tezuka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 344 days.

(21) Appl. No.: 16/141,209

(22) Filed: Sep. 25, 2018

(65) Prior Publication Data
US 2019/0093765 A1    Mar. 28, 2019

(30) Foreign Application Priority Data

Sep. 28, 2017 (JP) .............................. JP2017-188589

(51) Int. Cl.
*F16H 63/18* (2006.01)
*F16H 61/32* (2006.01)
*F16H 59/68* (2006.01)

(52) U.S. Cl.
CPC ............. *F16H 63/18* (2013.01); *F16H 59/68* (2013.01); *F16H 61/32* (2013.01); *F16D 2500/3021* (2013.01)

(58) Field of Classification Search
CPC .......... F16H 63/18; F16H 59/68; F16H 61/32; F16D 2500/3021
See application file for complete search history.

(56) References Cited

U.S. PATENT DOCUMENTS

| 7,631,570 | B2 | 12/2009 | Mizuno et al. | |
| 9,945,477 | B2 | 4/2018 | Nakamura et al. | |
| 2001/0023619 | A1* | 9/2001 | Ota | F16H 63/18 74/335 |
| 2007/0199392 | A1* | 8/2007 | Mizuno | F16H 3/30 74/325 |
| 2008/0078265 | A1* | 4/2008 | Shiozaki | F16H 63/18 74/473.12 |

(Continued)

FOREIGN PATENT DOCUMENTS

| JP | 2007-100739 A | 4/2007 |
| JP | 2016-070357 A | 5/2016 |

*Primary Examiner* — Victor L MacArthur
(74) *Attorney, Agent, or Firm* — Carrier Blackman & Associates, P.C.; William D. Blackman; Joseph P. Carrier

(57) ABSTRACT

A gear position of a multi-position transmission, which shifts and drives a vehicle according to a turn motion of a shift drum, is detected by a plurality of sensors. An end portion of the shift drum is fitted with an end portion of an elongated shaft rotated coaxially with the shift drum. A first sensor which is fitted to other end portion of the elongated shaft detects a turn position of the elongated shaft. A second sensor which is located outside in a radial direction of the elongated shaft between the one end portion and the other end portion of the elongated shaft detects that the elongated shaft is located at a specified turn position. The first sensor and the second sensor are fitted from the outside of a transmission case of the multi-position transmission and are exposed to the outside of the transmission case.

17 Claims, 20 Drawing Sheets

(56) References Cited

U.S. PATENT DOCUMENTS

| | | | | |
|---|---|---|---|---|
| 2008/0127766 | A1* | 6/2008 | Ogasawara | F16H 63/18 |
| | | | | 74/473.16 |
| 2009/0266192 | A1* | 10/2009 | Shiozaki | F16H 63/18 |
| | | | | 74/337.5 |
| 2010/0072018 | A1* | 3/2010 | Tsukada | F16D 25/0638 |
| | | | | 192/48.611 |
| 2010/0072019 | A1* | 3/2010 | Ogasawara | F16D 48/0206 |
| | | | | 192/48.611 |
| 2016/0091089 | A1* | 3/2016 | Nakamura | F16H 63/16 |
| | | | | 74/337.5 |
| 2016/0290441 | A1* | 10/2016 | Tsukada | F16H 63/18 |
| 2016/0290497 | A1* | 10/2016 | Nakamura | F16H 61/0213 |

\* cited by examiner

ARRANGEMENT STRUCTURE OF GEAR POSITION DETECTING SENSOR

CROSS-REFERENCE TO RELATED APPLICATIONS

The present application claims priority under 35 USC 119 to Japanese Patent Application No. 2017-188589 filed Sep. 28, 2017 the entire contents of which are hereby expressly incorporated by reference.

TECHNICAL FIELD

The present invention relates to an arrangement structure of a gear position detecting sensor and, in particular, to an arrangement structure of a gear position detecting sensor for detecting a present gear position in a multi-position transmission to which a shift drum is applied.

BACKGROUND ART

In a multi-position transmission of a sequential type in which a vehicle is shifted and driven according to a turn motion of a shift drum, there has been known a gear position detecting sensor for detecting a gear position selected at present.

In Patent Literature 1 is disclosed a multi-position transmission that includes a rotation angle sensor rotated coaxially with a shift drum and a rotation angle sensor rotated coaxially with a shift spindle to transmit a driving force of a shift motor to the shift drum and that improves an accuracy of detecting a gear position according to output signals of two rotation angle sensors.

Further, in Patent Literature 2 is disclosed a multi-position transmission that includes a first rotation angle sensor rotated coaxially with a shift drum and a second rotation sensor coupled to the shift drum via a speed increasing mechanism and that improves an accuracy of detecting a gear position according to output signals of the two rotation angle sensors.

CITATION LIST

Patent Document

Patent Document 1: JP 2007-100739 A
Patent Document 2: JP 2016-70357 A

SUMMARY OF THE INVENTION

Technical Problem

However, in a construction including a plurality of sensors to detect the gear position of the multi-position transmission as disclosed in Patent Literatures 1, 2, the following problems will be presented: that is, sensors will be arranged inside and outside a transmission case so as to ensure a space in which the sensors is fixed, which hence reduces maintainability; and special parts will be required so as to protect the sensors and to lay wires.

An object of the present invention is to provide an arrangement structure of a gear position detecting sensor that can solve the problems of the related art and that can improve maintainability and protection of a plurality of sensors by a simple construction.

Solution to Problems

To achieve the afore-mentioned object, the present invention has a first feature, in an arrangement structure of a gear position detecting sensor for detecting a gear position of a multi-position transmission (TM) which gear position is shifted according to a turn motion of a shift drum (75), by a plurality of sensors (83, 85) in that an end portion of the shift drum (75) is fitted with an end portion of an elongated shaft (84) rotated coaxially with the shift drum (75), the arrangement structure of the gear position detecting sensor includes: a first sensor (85) which is fitted to other end portion of the elongated shaft (84) and which detects a turn position of the elongated shaft (84); and a second sensor (83) which is located outside in a radial direction of the elongated shaft (84) between the one end portion and the other end portion of the elongated shaft (84) and which detects that the elongated shaft (84) is located at a specified turn position, and the first sensor (85) and the second sensor (83) are fitted from the outside of a transmission case (66) of the multi-position transmission (TM) and are exposed to the outside of the transmission case (66).

The present invention has a second feature in that the transmission case (66) has two rotary member receiving portions (66a, 66b) formed on its surface side, the two rotary member receiving portions (66a, 66b) have their peripheral edge portions formed vertically so as to receive a rotary member rotated in conjunction with an engine (E) to input a driving force to the multi-position transmission (TM), and the second sensor (83) is arranged in a receiving depressed portion (90) opened to a lower side of the transmission case (66) at a position between the two rotary member receiving portions (66a, 66b.)

The present invention has a third feature in that the elongated shaft (84) is fitted integrally to an end portion of the shift drum (75), and a journal portion (84a) closer to the shift drum (75) of the elongated shaft (84) is journaled on a crankcase (CC) side of the engine (E).

The present invention has a fourth feature in that the first sensor (85) is a rotation angle sensor to increase or decrease an output voltage according to a turn motion of the shift drum (75), and the second sensor (83) is a switch sensor which is turned on or off when the second sensor (83) is put into contact with or brought out of contact with a sensor cam (82) provided vertically on an outer peripheral surface of the elongated shaft (84).

The present invention has a fifth feature for comprising a shift spindle (76) which is arranged in parallel to the shift drum (75) and which transmits a rotational driving force to the shift drum (75); and a third sensor (86) which is rotated coaxially with the shift spindle (76) and which detects a rotation angle of the shift spindle (76), wherein the first sensor (85), the second sensor (83), and the third sensor (86) are arranged offset to each other in an axial direction of the shift drum (75).

The present invention has a sixth feature in that the two rotary member receiving portions (66a, 66b) include: a first rotary member receiving portions (66a) to receive an output shaft (19) of the multi-position transmission (TM); and a second rotary member receiving portions (66b) to receive a generator (59) coupled to an end portion of a crankshaft (60) of the engine (E).

The present invention has a seventh feature in that the sensor cam (82) is formed in such a way as to be offset to a shift gear (G) in an axial direction and to overlap the shift gear (G) in a radial direction, the shift gear (G) constructing the multi-position transmission (TM).

The present invention has an eighth feature in that the transmission case (66) has a protection rib (91) formed vertically in such a way as to cover a lower surface of the third sensor (86).

The present invention has a ninth feature in that the transmission case (66) is fitted to a surface on a vehicle body rear side of the crankcase (CC) of the engine (E) of a saddled four wheeled vehicle (1).

Effects of the Invention

According to the first feature of the present invention, in an arrangement structure of a gear position detecting sensor for detecting a gear position of a multi-position transmission (TM) which gear position is shifted according to a turn motion of a shift drum (75), by a plurality of sensors (83, 85) in that an end portion of the shift drum (75) is fitted with an end portion of an elongated shaft (84) rotated coaxially with the shift drum (75), the arrangement structure of the gear position detecting sensor includes: a first sensor (85) which is fitted to other end portion of the elongated shaft (84) and which detects a turn position of the elongated shaft (84); and a second sensor (83) which is located outside in a radial direction of the elongated shaft (84) between the one end portion and the other end portion of the elongated shaft (84) and which detects that the elongated shaft (84) is located at a specified turn position, and the first sensor (85) and the second sensor (83) are fitted from the outside of a transmission case (66) of the multi-position transmission (TM) and are exposed to the outside of the transmission case (66). Therefore, two sensors arranged at different positions are arranged in such a way as to be accessible from the outside of the transmission case, so an assembling work and a wiring work can be easily performed and both sensors can be inspected and maintained from the outside of the transmission case. Further, the turn position of the shift drum can be detected with a high accuracy by the two sensors of the first and second sensors.

According to the second feature of the present invention, the transmission case (66) has two rotary member receiving portions (66a, 66b) formed on its surface side, the two rotary member receiving portions (66a, 66b) have their peripheral edge portions formed vertically so as to receive a rotary member rotated in conjunction with an engine (E) to input a driving force to the multi-position transmission (TM), and the second sensor (83) is arranged in a receiving depressed portion (90) opened to a lower side of the transmission case (66) at a position between the two rotary member receiving portions (66a, 66b). Therefore, the receiving depressed portion to receive the second sensor by the use of a dead space between two rotary member receiving portions. The second sensor is embedded in a wall portion of this receiving depressed portion, so an excellent accessibility can be kept and the sensors can be protected from moisture and flying stones.

According to the third feature of the present invention, the elongated shaft (84) is fitted integrally to an end portion of the shift drum (75), and a journal portion (84a) closer to the shift drum (75) of the elongated shaft (84) is journaled on a crankcase (CC) side of the engine (E). Therefore, the end portion of the shift drum is not required to be provided with the journal portion, which hence can simplify a structure of the shift drum to thereby reduce weight and production man-hour. Further, a coupling rigidity of the shift drum and the elongated shaft can be enhanced, which hence can improve a detection accuracy by the first and second sensors.

According to the fourth feature of the present invention, the first sensor (85) is a rotation angle sensor to increase or decrease an output voltage according to a turn motion of the shift drum (75), and the second sensor (83) is a switch sensor which is turned on or off when the second sensor (83) is put into contact with or brought out of contact with a sensor cam (82) provided vertically on an outer peripheral surface of the elongated shaft (84). Therefore, the first and second sensors are arranged at different positions according to their structures and working motions, which hence can reduce installation spaces. Further, even in a case where rotation angle sensors having a dead zone (in which the rotation angle can be detected within 360 degrees) are employed, a correct turn position of the shift drum can be detected by a combination of the output signals of the switch sensors.

According to the fifth feature of the present invention, it comprising a shift spindle (76) which is arranged in parallel to the shift drum (75) and which transmits a rotational driving force to the shift drum (75); and a third sensor (86) which is rotated coaxially with the shift spindle (76) and which detects a rotation angle of the shift spindle (76), wherein the first sensor (85), the second sensor (83), and the third sensor (86) are arranged offset to each other in an axial direction of the shift drum (75). Therefore, the three sensors arranged at positions close to each other in a radial direction can be fixed without interfering with each other. Further, the three sensors are arranged close to each other outside the transmission case, so the three sensors can be inspected and maintained at the same time.

According to the sixth feature of the present invention, the two rotary member receiving portions (66a, 66b) include: a first rotary member receiving portions (66a) to receive an output shaft (19) of the multi-position transmission (TM); and a second rotary member receiving portions (66b) to receive a generator (59) coupled to an end portion of a crankshaft (60) of the engine (E). Therefore, the rotary member receiving portions can be formed according to a general axis arrangement in an engine having a transmission integrally provided therewith and a receiving depressed portion to receive the second sensor can be formed.

According to the seventh feature of the present invention, the sensor cam (82) is formed in such a way as to be offset to a shift gear (G) in an axial direction and to overlap the shift gear (G) in a radial direction, the shift gear (G) constructing the multi-position transmission (TM). Therefore, it is possible to reduce a dead space as much as possible and to prevent the multi-position transmission from being enlarged in size.

According to the eighth feature of the present invention, the transmission case (66) has a protection rib (91) formed vertically in such a way as to cover a lower surface of the third sensor. Therefore, among the three sensors, the third sensor located most outside can have its lower surface protected from flying stones and the like. Further, the third sensor is arranged outside in the axial direction of the first sensor, so the first sensor can be protected from flying stones and the like.

According to the ninth feature of the present invention, the transmission case (66) is fitted to a surface on a vehicle body rear side of the crankcase (CC) of the engine (E) of a saddled four wheeled vehicle (1). Therefore, the respective sensors are located on the vehicle body rear side of the engine, so the respective sensors can be protected from stones flying from the front side of the vehicle body.

DESCRIPTION OF EMBODIMENTS

Figure 1:
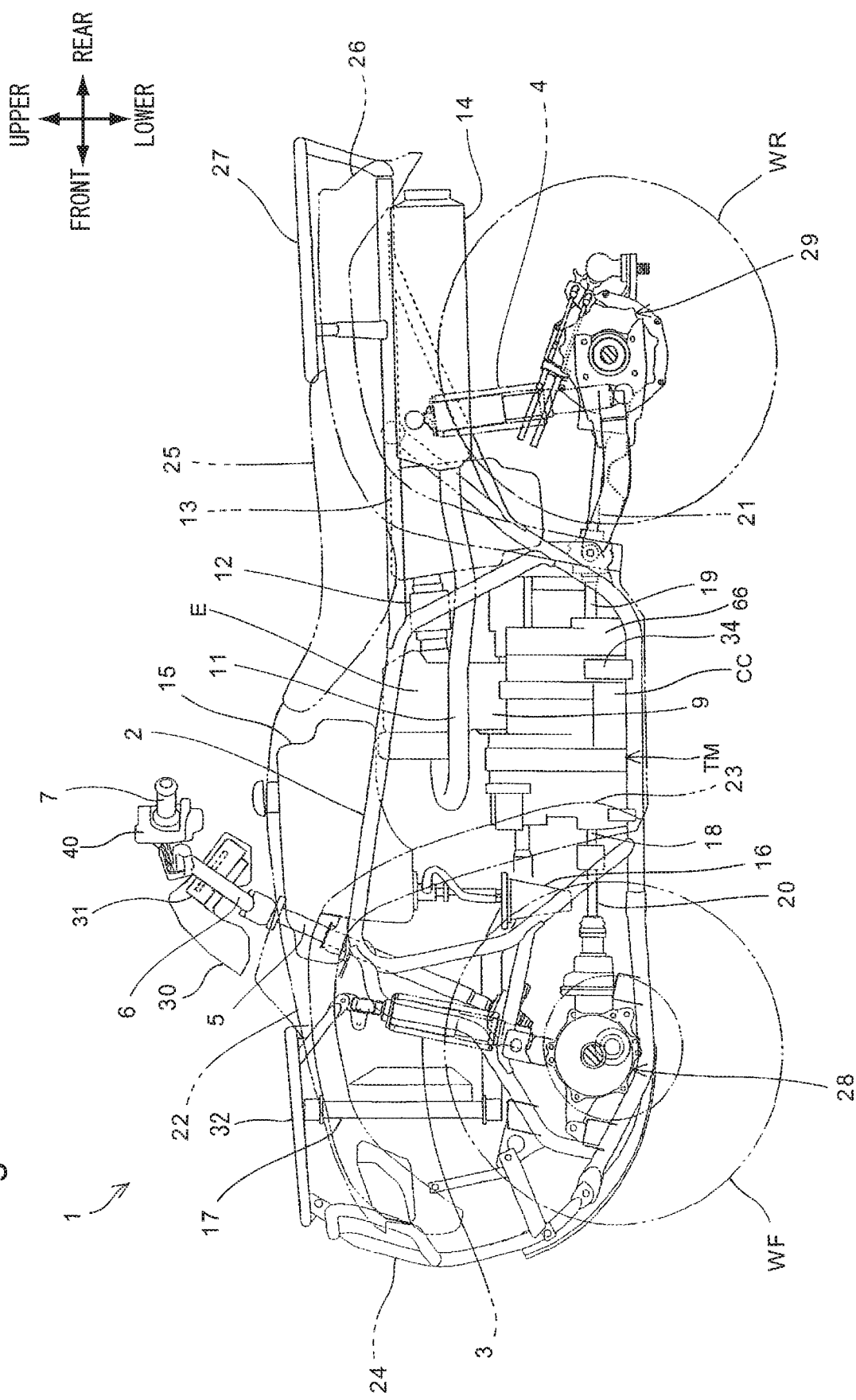
FIG. 1 is a left side view of an ATV to which a gear position detecting device according to an embodiment of the present invention is applied.
Figure 2:
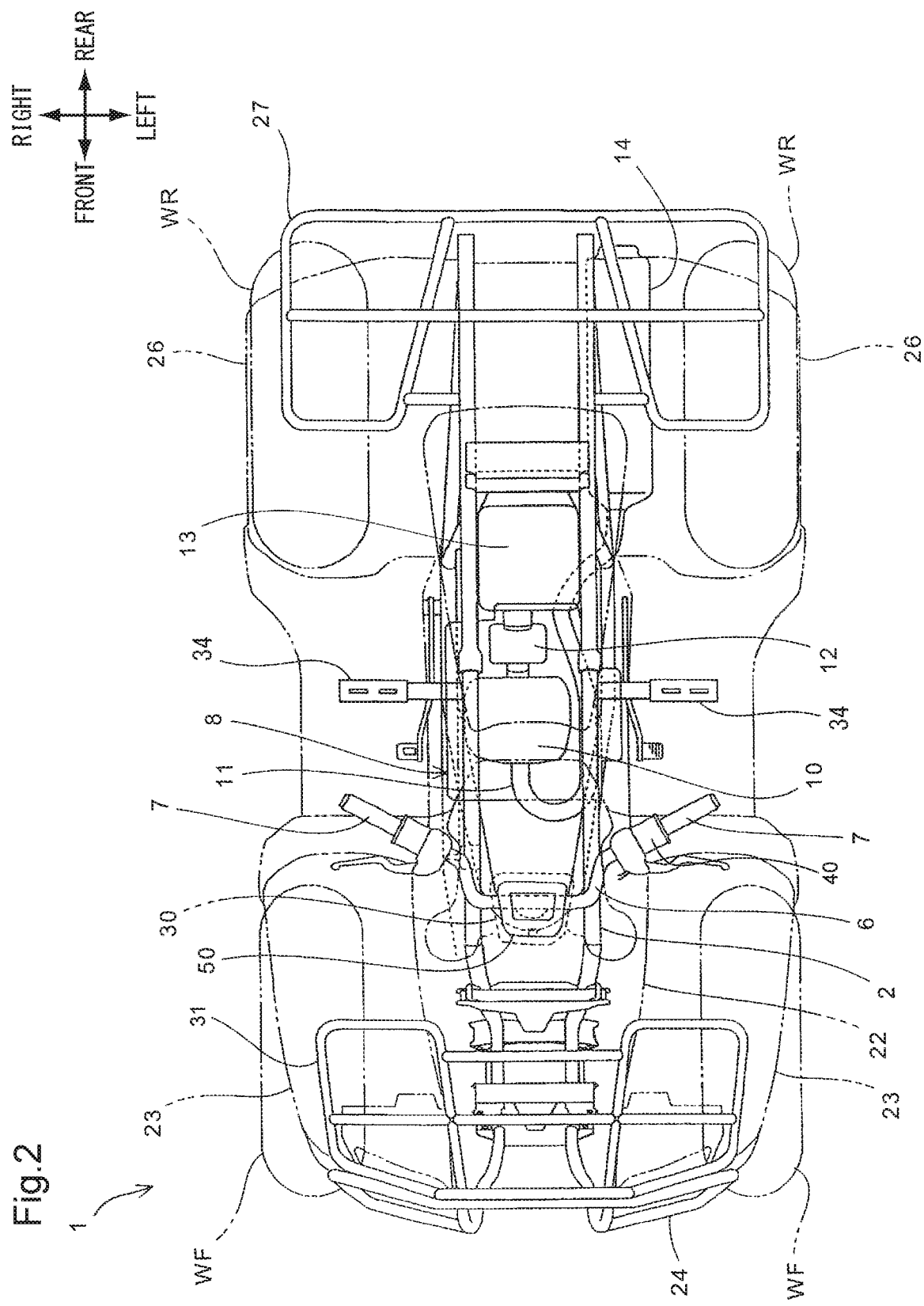
FIG. 2 is a plan view of the ATV.

Hereinafter, a preferable embodiment of the present invention will be described with reference to the drawings. FIG. 1 is a left side view of an ATV (All Terrain Vehicle) related to one embodiment of the present invention. Further, FIG. 2 is a plan view of the ATV1. The ATV1 is a saddled four-wheeled vehicle that has a compact and light vehicle body provided with a balloon tire of a large diameter and a low pressure to thereby enable a large ground clearance of undercarriage and that hence improves a travelling performance especially on rough terrain to thereby respond to all terrain.

A front wheel WF is fixed to a front side of a vehicle body frame 2 via a front suspension 3, whereas a rear wheel WR is fixed to a rear side of the vehicle body frame 2 via a rear suspension 4. An engine E as a driving source is mounted nearly in a central portion of the vehicle body frame 2 in a longitudinal arrangement in which a crankshaft of the engine E is oriented in a vehicle longitudinal direction. The engine E of a four-cycle single cylinder has a construction in which a cylinder 9 is provided vertically on an upper portion of a crankcase CC. A front output shaft 18 to output a rotational driving force of the engine E to the front wheel WF is extended to a front side from a position offset to a left side in a vehicle width direction of the crankcase CC, whereas a rear output shaft 19 to output the rotational driving force of the engine E to the rear wheel WR is extended to a rear side from the position offset to the left side in the vehicle width direction of the crankcase CC.

The rotational driving force transmitted to the front output shaft 18 is transmitted to the front wheel WF via a front drive shaft 20 and a front final reduction gear unit 28, whereas the rotational driving force transmitted to the rear output shaft 19 is transmitted to the rear wheel WR via a rear drive shaft 21 and a rear final reduction gear unit 29. A transmission case 66 of a multi-position transmission TM received in the crankcase CC is fixed to a lower rear end of the engine E.

A throttle body 12 is coupled to a rear portion of the cylinder 9 of the engine E and an air cleaner case 13 is coupled to a rear portion of the throttle body 12. Further, a base end portion of an exhaust pipe 11 is coupled to a front portion of the cylinder 9. The exhaust pipe 11 is folded back in front of the cylinder 9 and is passed on a left side in the vehicle width direction of the cylinder 9 and is extended backward to be coupled to a muffler 14.

A steering shaft 5 is coupled to a lower portion of a steering handlebar 6 whose left and right end portions are fixed with handle grips 7. A lower end portion of the steering shaft 5 is coupled to a front wheel steering mechanism. A radiator 17 of a cooling water of the engine E is arranged on a front side of the vehicle body of the steering shaft 5, whereas a fuel tank 15 is arranged on a rear side of the vehicle body of the steering shaft 5. A fuel pump 16 is arranged below the fuel tank 15, the fuel pump 16 pressure-feeding fuel to a fuel injection device which is not shown in the drawings. A seat 25 is arranged on a rear side of the fuel tank 15. A meter device 31 and a meter visor 30 are fixed in a center of the vehicle width direction of the steering handlebar 6.

To a front portion of the vehicle body frame 2 are fixed a front cover 22 which covers a front portion of the vehicle front body, and a pair of left and right front fenders 23 which cover the front wheel WF from an upper side to a rear side, a front bumper 24, and a front carrier 32. Further, to a rear portion of the vehicle body frame 2 are fixed a rear fender 26 and a rear carrier 27 which cover the rear wheel WR from an upper side to a front side. On the left and right sides in the vehicle width direction of the engine E are arranged footrest steps 34 of an occupant.

Figure 3:
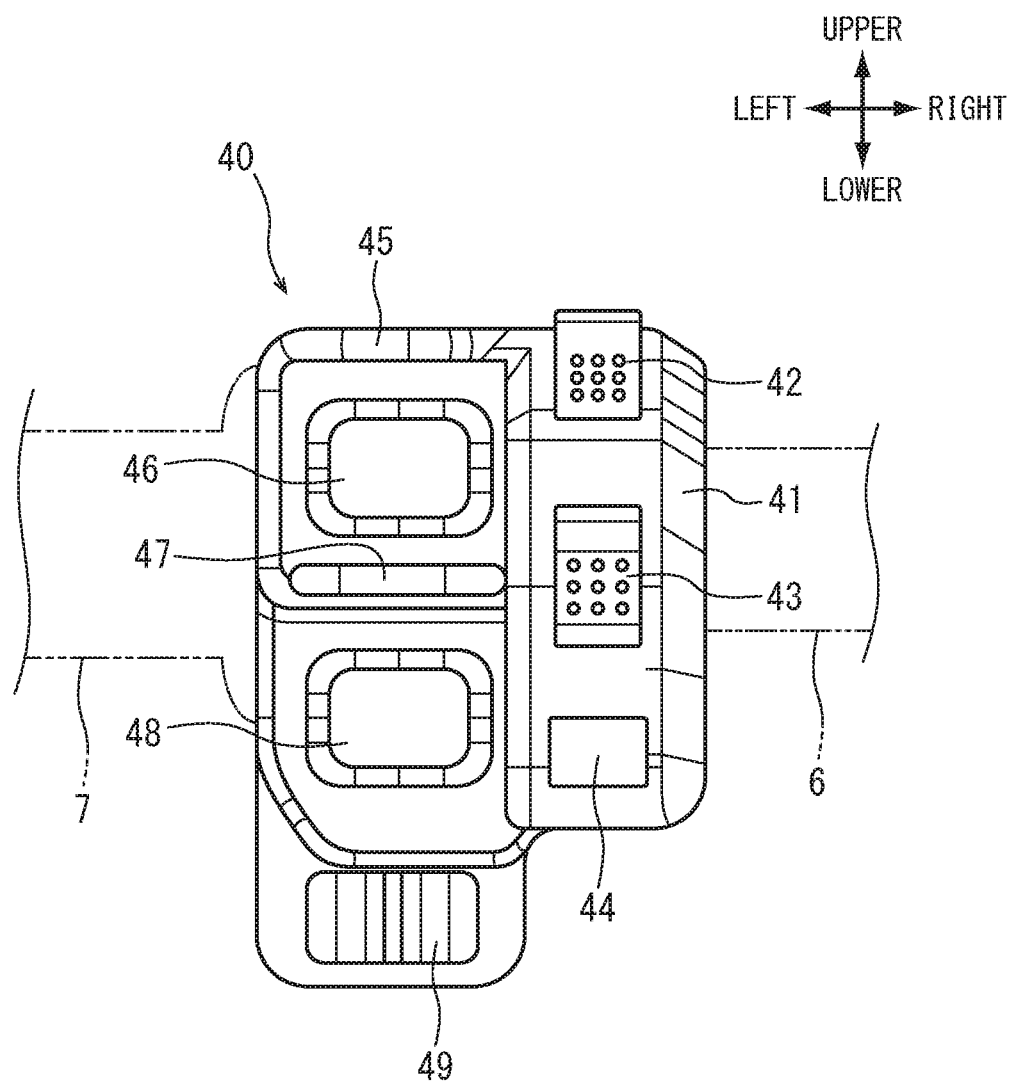
FIG. 3 is a front view of a handlebar switch fixed to the left side of the steering handlebar.
Figure 4:
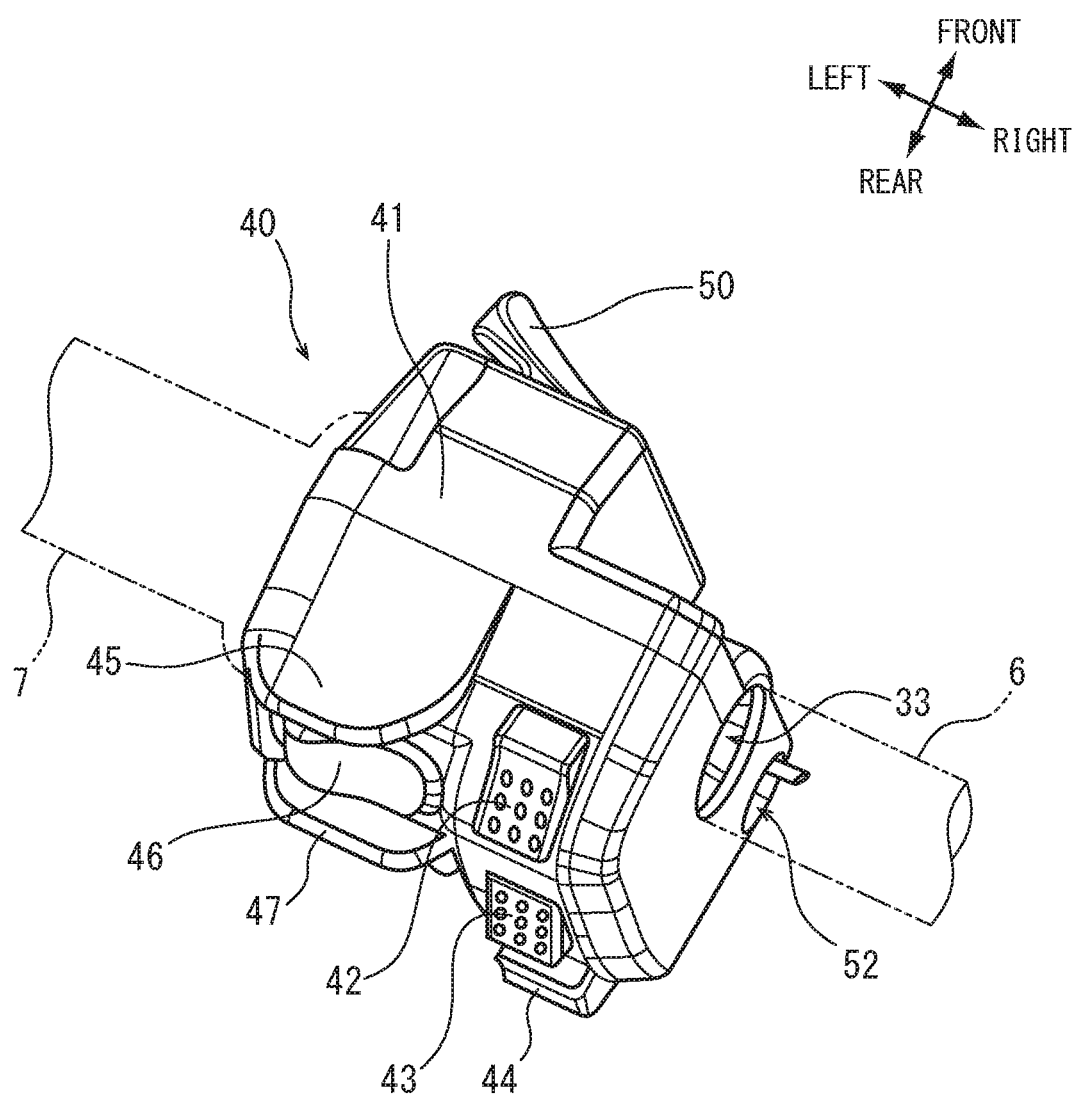
FIG. 4 is a perspective view of the handlebar switch.
Figure 5:
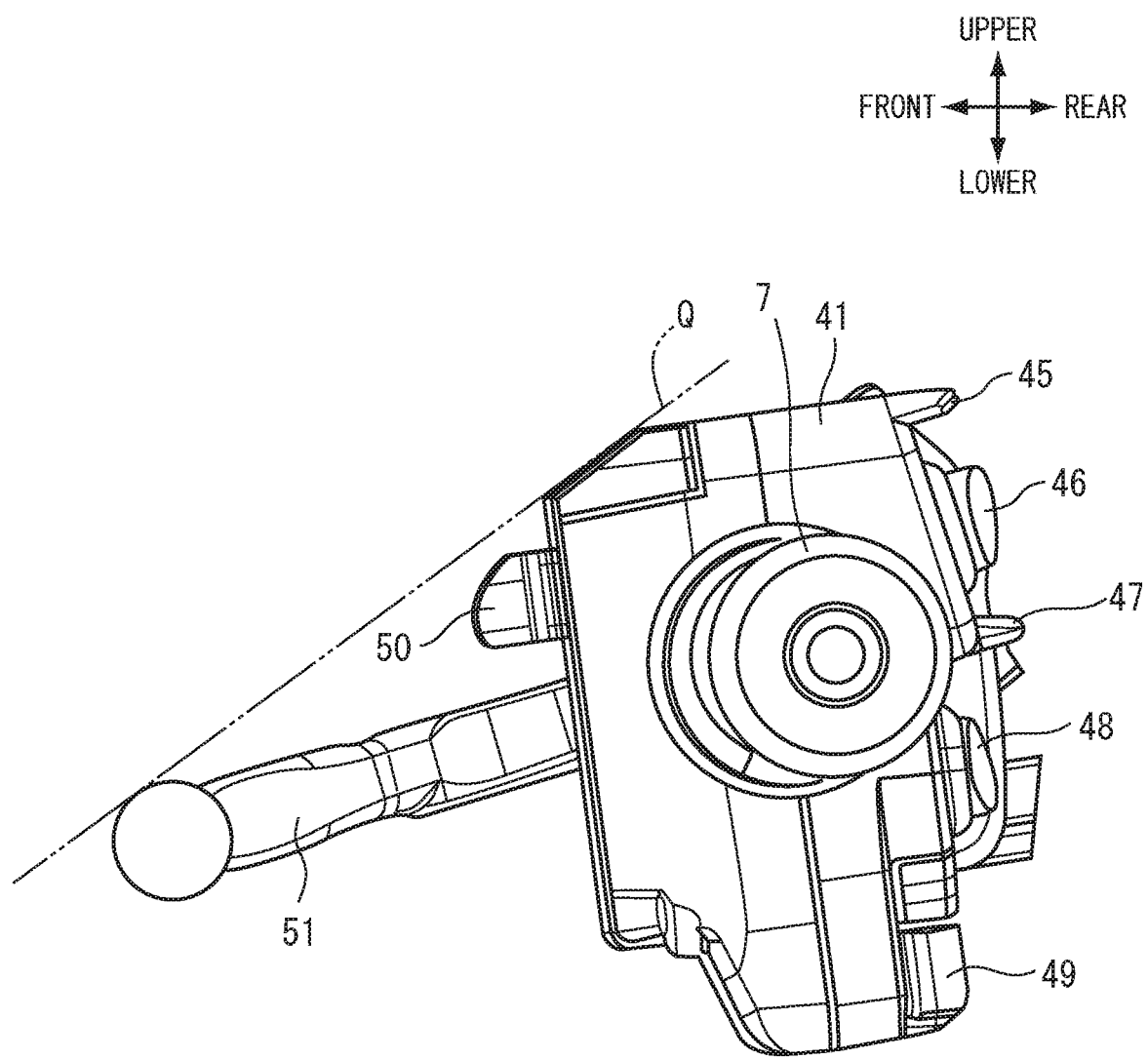
FIG. 5 is a side view, when viewed from the left side of the vehicle body, of the handlebar switch.

FIG. 3 is a front view of a handlebar switch 40 fixed to the left side of the steering handlebar 6. Further, FIG. 4 is a perspective view of the handlebar switch 40 and FIG. 5 is a side view, when viewed from the left side of the vehicle body, of the handlebar switch 40. The multi-position transmission TM combined with the engine E is of a sequential type which includes five-forward speed positions and one-backward speed position and is constructed in such a way that a vehicle speed can be varied by means of a shift drum driven by a shift motor between reverse gear position↔neutral position↔first gear position↔second gear position↔third gear position↔fourth gear position↔fifth gear position by a switching operation.

In a housing 41 of the handlebar switch 40 are arranged not only a light axis selector switch 42, a light switch 43, a starter switch 44, an engine stop switch 49 but also a shift-up switch 46 and a shift-down switch 48 which change a gear position of the multi-position transmission TM. The multi-position transmission TM has a centrifugal starting clutch and a hydraulically controlled twin clutch applied thereto, the hydraulically controlled twin clutch being used for changing the gear position. Therefore, a driver is not required to operate a clutch.

On a vehicle body front side of the housing 41 is arranged a reverse permission switch 50 which is pulled toward the driver and activated by a driver's left index finger. The reverse permission switch 50 functions as an inhibitor switch which permits the gear position to be shifted down to the reverse gear position only when both of the reverse permission switch 50 and the shift-down switch 48 are operated. In this regard, by operating the reverse permission switch 50, the gear position can be shifted down from the neutral position to the reverse gear position, and the gear position can be shifted down from the first gear position to the reverse gear position by skipping the neutral position, and in addition the gear position can be shifted up from the reverse gear position to the first gear position by skipping the neutral position.

Between the shift-up switch 46 and the shift-down switch 48 is arranged a central partition plate 47 which is provided vertically on a vehicle body rear side to prevent an erroneous operation. Further, above the shift-up switch 46 is arranged an upper partition plate 45 to protect the shift-up switch 46 and to prevent the erroneous operation. In a side face on a vehicle body center side of the housing 41 are formed an upper opening 33 through which the steering handlebar 6 is passed and a lower opening 52 through which a harness to bind switching wires is passed.

Referring to FIG. 5, the reverse permission switch 50 projected out to the vehicle body front side of the housing 41, when viewed from the side of the vehicle body, is arranged below a straight line Q to connect a tip portion of a brake lever 51 and an upper end portion of the housing 41. In this way, even in a case where the ATV1 should be turned over and the housing 41 and the brake lever 51 should be put into contact with the ground, it is possible to prevent the reverse permission switch 50 from being activated against a driver's intension and to protect the reverse permission switch 50.

Figure 6:
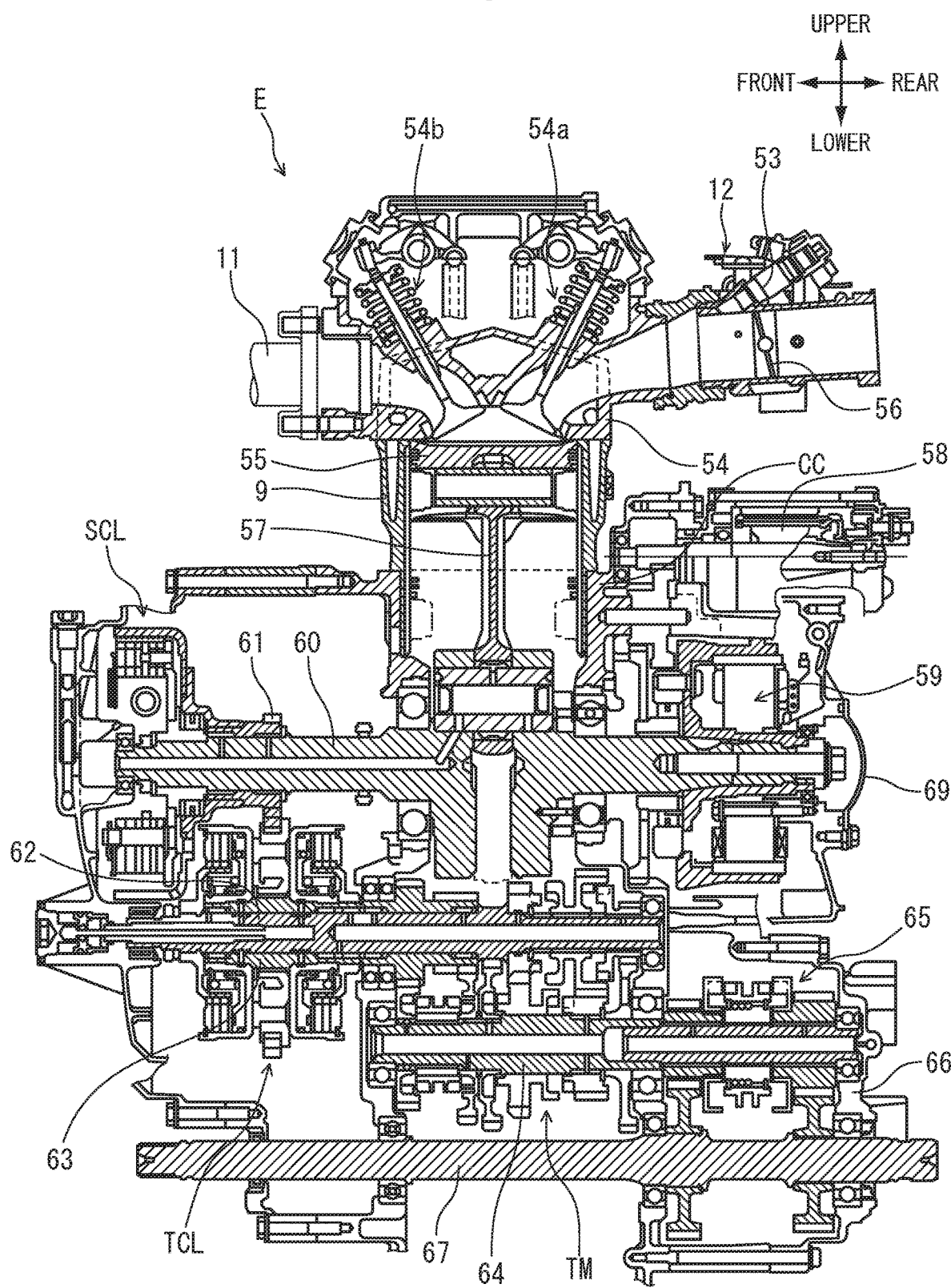
FIG. 6 is a section view of the engine and the multi-position transmission.

FIG. 6 is a section view of the engine E and the multi-position transmission MT. A crankshaft 60 of the engine E is rotatably journaled in a nearly central portion of the crankcase CC. To an upper portion of the crankcase CC is fixed a cylinder 9 in which a piston 55 supported by a connecting rod 57 is reciprocated, whereas to an upper portion of the cylinder 9 is fixed a cylinder head 54 to receive valve trains 54*a*, 54*b* for intake and exhaust. To the vehicle body rear side of the cylinder head 54 is coupled the throttle body 12 including a fuel injection device 53 and a throttle valve 56, whereas to the vehicle body front side of the cylinder head 54 is coupled the exhaust pipe 11.

To a vehicle body rear side end portion of the crankshaft 60 is fixed a generator 59 rotated synchronously with the crankshaft 60. Above the generator 59 is arranged a cell motor 58 to provide a rotational driving force to the crankshaft 60 at the time of starting the engine E. Meanwhile, to a vehicle body front side end portion of the crankshaft 60 is fixed a starting clutch SCL formed of a centrifugal type clutch. When a rotational speed of the crankshaft 60 becomes more than a specified value, the starting clutch SCL is switched from a state where the starting clutch SCL is separated to a state where the starting clutch SCL is connected to thereby transmit the driving force to a twin clutch TCL via a primary driven gear 61.

Main shafts 62, 63 and a counter shaft 64 of the multi-position transmission TM, which is provided with a plurality of pairs of shift gears, are rotatably journaled by the crankcase CC below the crankshaft 60. The main shaft 62 is constructed of an inner main shaft 62 and the main shaft 63 is constructed of an outer main shaft 63, the inner main shaft 62 and the outer main shaft 63 being formed of a double structure and being coaxially rotated. The inner main shaft 62 and the outer main shaft 63 are connected respectively to a first clutch and a second clutch which construct the twin clutch TCL. The inner main shaft 62 transmits the driving force to odd-number position gears (first gear, third gear, fifth gear) of the multi-position transmission TM, whereas the outer main shaft 63 transmits the driving force to even-number position gears (second gear, fourth gear) and a reverse gear of the multi-position transmission TM. The multi-position transmission TM switches the gear position to be selected by the shift drum, which will be described later, and switches a driving force transmission to the inner main shaft 62 and the outer main shaft 63 by the twin clutch TCL, thereby performing a shift motion.

The multi-position transmission TM related to the present embodiment has not only a main transmission, which includes five forward gears and one backward gear, but also a counter transmission 65 which shifts an output of the main transmission to two steps of a low speed and a high speed. As described above, the main transmission is an automatic transmission to drive the twin clutch TCL and the shift drum by an actuator, whereas the counter transmission 65 is of a manual type in which an engagement of the shift gears is directly changed by a manual operation of the driver. In this regard, the main transmission performs the shift motion by operating the shift-up switch 46 and the shift-down switch 48, in other words, semi-automatically performs the shift motion. However, the main transmission can automatically perform the shift motion among the first gear and the fifth gear according to a vehicle speed and an engine speed and can switch the gear position to the first gear when the vehicle stops regardless of a switch operation of the driver, in other words, can perform also an automatic shift motion.

The rotational driving force having the speed decreased by the counter transmission 65 is transmitted in a vehicle longitudinal direction via an output shaft 67. The front output shaft 18 (see FIG. 1) is coupled to a front end portion of the output shaft 67, whereas the rear output shaft 19 is coupled to a rear end portion of the output shaft 67. The rear end portion of the output shaft 67 is projected out to a vehicle body rear side from the transmission case 66 which is fixed to a vehicle body rear side of the crankcase CC and which receives the generator 59. The vehicle body rear side of the generator 59 is covered with a recoil starter cover 69.

Figure 7:
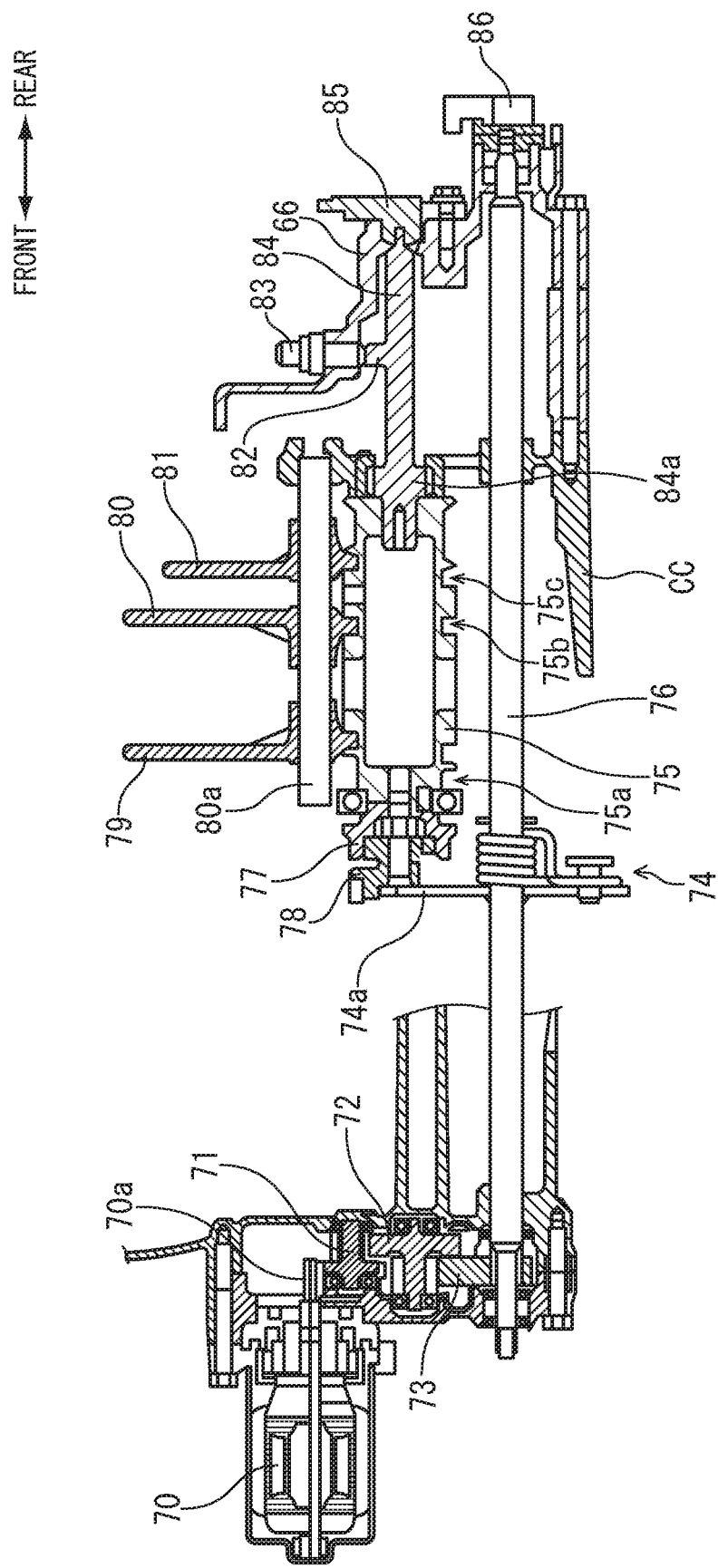
FIG. 7 is a section view to show a drive mechanism of a shift drum.

FIG. 7 is a section view to show a drive mechanism of a shift drum 75. Near the multi-position transmission TM shown in FIG. 6, the shift drum 75 formed in a shape of a hollow cylinder is rotatably journaled with respect to the crankcase CC. The shift drum 75 is arranged in parallel to an axial direction of the multi-position transmission TM and has lead grooves 75*a*, 75*b*, 75*c* formed on its outer peripheral surface, the lead grooves 75*a*, 75*b*, 75*c* being engaged with cylindrical protrusions formed in the lower end portion of shift forks 79, 80, 81 shown in FIG. 7. The shift forks 79, 80, 81 are slidably engaged with a fork rod 80*a* arranged in parallel to the shift drum 75. In this way, when the shift drum 75 is turned, a sleeve member engaged with tip end portions of the shift forks 79, 80, 81 is slid in an axial direction, thereby switching an engaged state in the axial direction of the shift gear to construct the main transmission.

A turning motion of the shift drum 75 is performed by a shift motor 70 driven and controlled by a control unit (ECU) which will be described later. A rotational driving force of the shift motor 70 is transmitted from an output shaft 70*a* to a shift spindle 76 via two intermediate gears 71, 72 and a fan-shaped gear 73. The shift spindle 76 is fixed with a plate-shaped shift arm 74*a* via a lost motion mechanism 74. A left end portion of the shift drum 75 shown in FIG. 7 has a drum center 77 fixed thereto, the drum center 77 regulating a turn position of the shift drum 75. When the shift arm 74*a* is once reciprocated forward and backward by a specified angle, the drum center 77 and the shift drum 75 are turned in one direction by a specified angle via a pawl ratchet mechanism 78.

To a right end portion (vehicle body rear side) of the shift drum 75 shown in FIG. 7 is fixed an elongated shaft 84 rotated coaxially with the shift drum 75. The elongated shaft 84 is coupled to the shift drum 75 in a spline engagement, which provides a high coupling rigidity and a high dimensional accuracy. A right end portion of the elongated shaft 84 shown in FIG. 7 is projected out from the transmission case 66 fixed to a right side of the crankcase CC shown in FIG. 7 and is coupled to a rotation angle sensor 85 as a first sensor, the rotation angle sensor 85 being fixed from the outside of the transmission case 66. The rotation angle sensor 85 is a volume sensor to increase or decrease an output voltage (sensor output) according to the turning motion of the shift drum 75.

In a middle portion of the elongated shaft 84 is formed a sensor cam 82 whose outer peripheral surface has a portion projected out, and a position senor 83 as a second sensor is arranged on the outside in a radial direction of the sensor cam 82. The position sensor 83 is a switch sensor working in the following manner: that is, when the position sensor 83 is brought into contact with the sensor cam 82, the position sensor 83 is turned on, whereas when the position sensor 83 is brought out of contact with the sensor cam 82, the position sensor 83 is turned off. The position sensor 83 has a reciprocating switch shaft fixed to the transmission case 66 from the outside in such a way as to direct to the outside in the radial direction from a center of the elongated shaft 84.

The position sensor 83 related to the present embodiment is constructed as a neutral switch to detect a neutral position of the shift drum 75. A turn position of the shift drum 75 is detected on the basis of output signals of the rotation angle sensor 85 and the position sensor 83, which hence improves a detection accuracy of the turn position of the shift drum 75. Further, a right end portion of the shift spindle 76 shown in FIG. 7 is projected out from the transmission case 66 and is coupled to a shift spindle rotation angle sensor 86 as a third sensor, the shift spindle rotation angle sensor 86 being fixed from the outside of the transmission case 66.

The elongated shaft 84 has a large-diameter journal portion 84a formed at a position closer to the shift drum 75 and a right side of the shift drum 75 shown in FIG. 7 is journaled by the crankcase CC by means of the journal portion 84a. This construction can eliminate a necessity to provide an end portion of the shift drum 75 with a journal portion, which hence can simplify a structure of the shift drum 75 and hence can reduce a weight and production man-hours of the shift drum 75. Further, this construction can improve a coupling rigidity of the shift drum 75 and the elongated shaft 84 and hence can improve a detection accuracy in the rotation angle sensor 85 and the position sensor 83.

Figure 8:
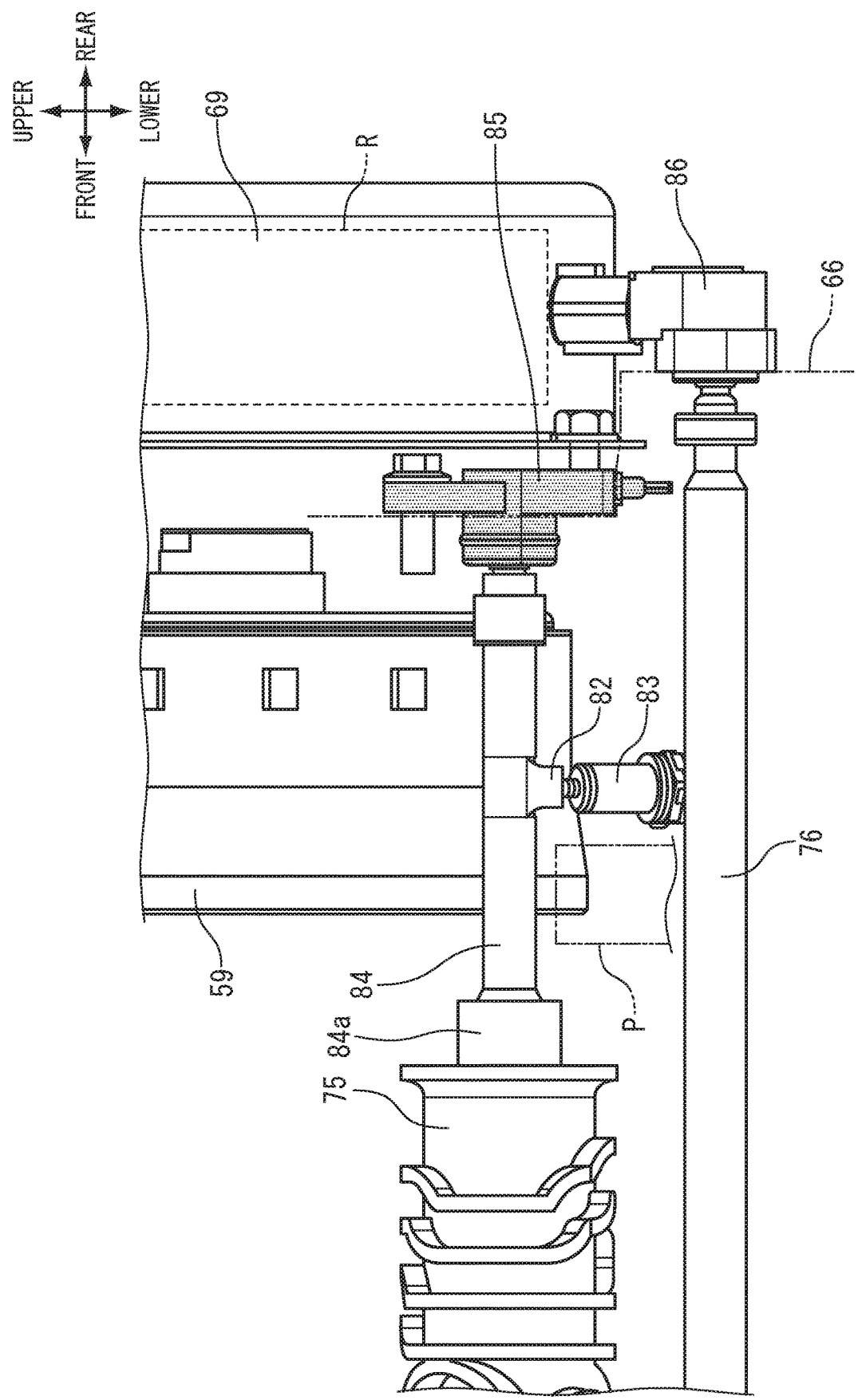
FIG. 8 is an arrangement structure view of the rotation angle sensor, the position sensor, and the shift spindle rotation angle sensor.

FIG. 8 is an arrangement structure view of the rotation angle sensor 85, the position sensor 83, and the shift spindle rotation angle sensor 86. This figure shows a state where the rotation angle sensor 85, the position sensor 83, and the shift spindle rotation angle sensor 86 are viewed from a left side of the vehicle body with the crankcase CC and the transmission case 66 erased. The position sensor 83 is arranged on a vehicle body lower side of the elongated shaft 84. As described above, the rotation angle sensor 85 is coupled to the end portion of the elongated shaft 84, whereas the shift spindle rotation angle sensor 86 is coupled to the end portion of the shift spindle 76 at a position closer to a vehicle body rear side than the rotation angle sensor 85.

In this way, these three sensors are arranged in such a state as to be offset to each other in an axial direction of the shift drum 75, so the three sensors arranged at close positions in a radial direction can be fixed to the transmission case 66 without interfering with each other. Further, the three sensors are arranged close to each other outside the transmission case 66, so the three sensors can be inspected and maintained at the same time from the outside of the transmission case 66.

The position sensor 83 is arranged at a position in which the position sensor 83 overlaps the generator 59 in the axial direction. The generator 59 can have a recoil starter R provided on the vehicle body rear side thereof, the recoil starter R being capable of turning the crankshaft 60 manually when a rope-shaped member wound on a bobbin is pulled. The recoil starter cover 69 is fixed to the transmission case 66. The recoil starter cover 69 covers the recoil starter R and is formed nearly in a shape of a cylinder having a closed end. The shift spindle rotation angle sensor 86 is arranged at a position overlapping the recoil starter cover 69 in the axial direction.

Further, the sensor cam 82 is formed so as to be offset with respect to a shift gear G in the axial direction and overlaps the shift gear P in the radial direction, the shift gear G constructing the multi-position transmission TM. This can reduce a dead space as much as possible and can hence prevent the multi-position transmission TM from being increased in size.

In this way, according to an arrangement structure of the gear position detecting sensor related to the present embodiment, to the end portion of the shift drum 75 is fixed the one end portion of the elongated shaft 84 rotated coaxially with the shift drum 75. The rotation angle sensor 85 for detecting the turn position of the elongated shaft 84 is fixed to the other end of the elongated shaft 84. The position sensor 83 is located outside in the radial direction of the elongated shaft 84 between the one end portion and the other end portion of the elongated shaft 84 and detects that the elongated shaft 84 is at a specified turn position. The rotation angle sensor 85 and the position sensor 83 are fixed from the outside of the transmission case 66 of the multi-position transmission TM and are exposed to the outside of the transmission case 66. Therefore, the turn position of the shift drum 75 can be detected with a high accuracy by the rotation angle sensor 85 and the position sensor 83. Further, the two sensors 85, 83 are arranged at different positions in such a way as to be accessible from the outside of the transmission case 66. Therefore, an assembling work and a wiring work of the two sensors 85, 83 can be easily performed and the two sensors 85, 83 can be inspected and maintained from the outside of the transmission case 66.

Figure 9:
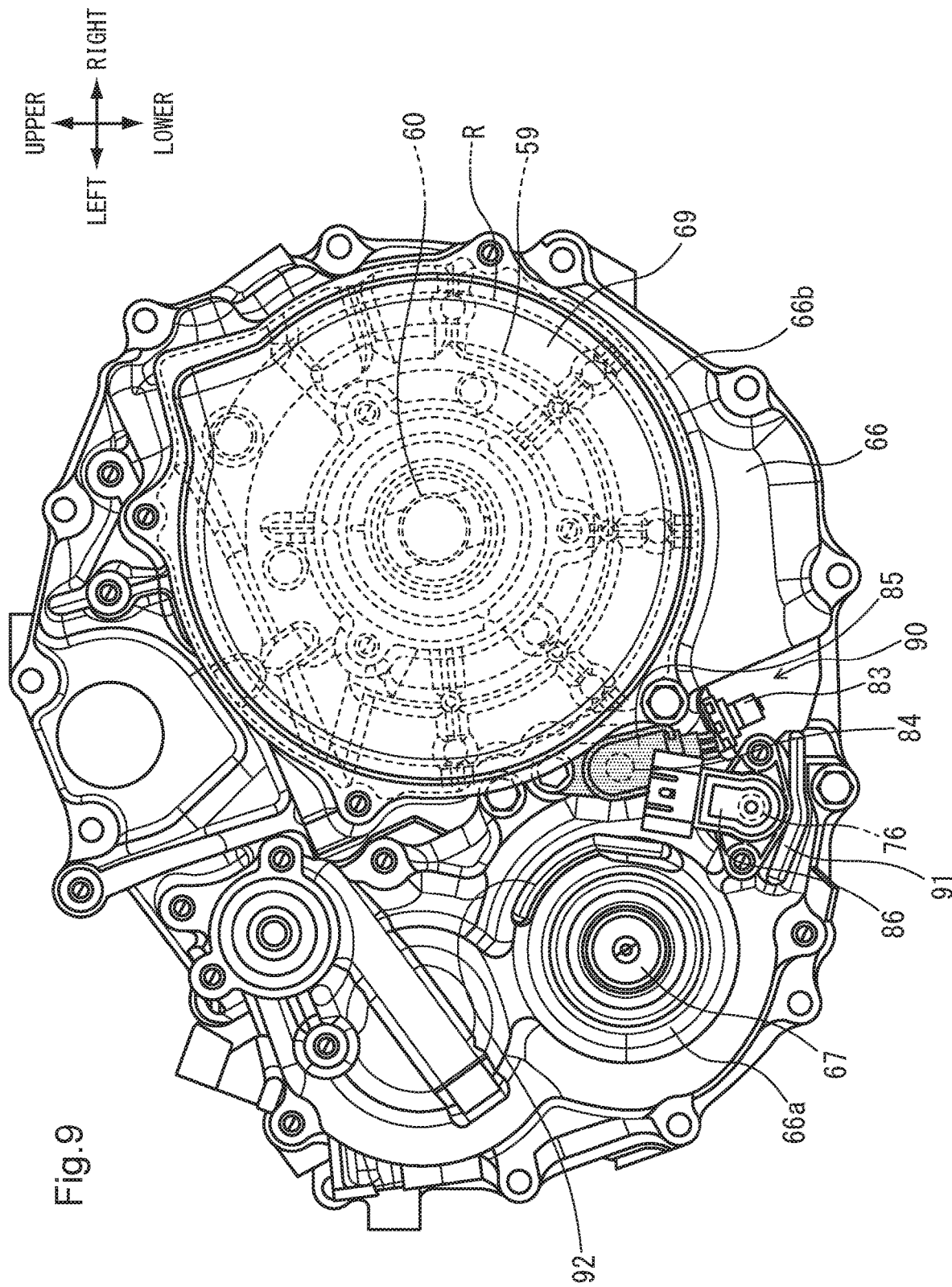
FIG. 9 is a front view (when viewed from a rear side of the vehicle body) of the transmission case.
Figure 10:
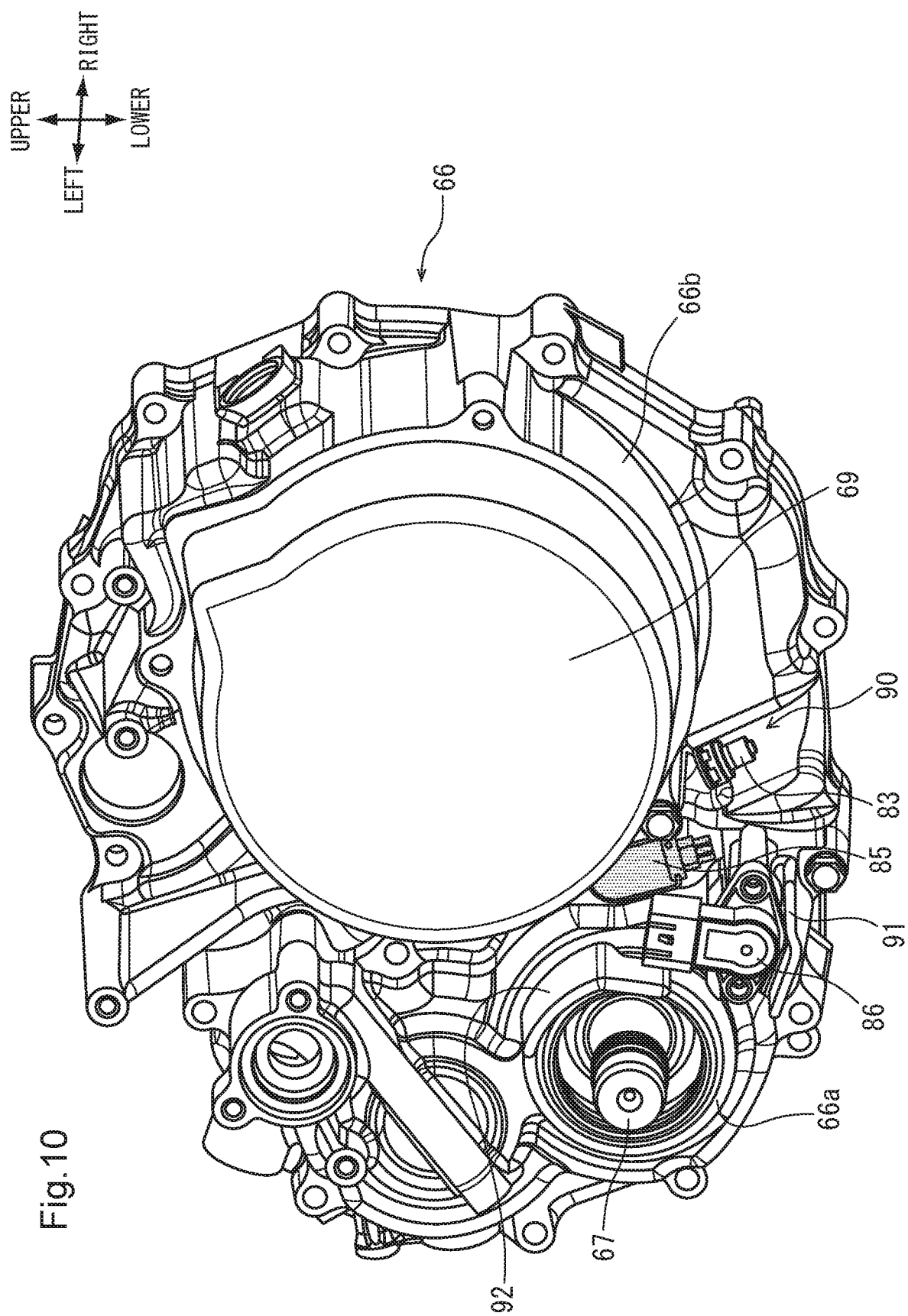
FIG. 10 is a perspective view of the transmission case.
Figure 11:
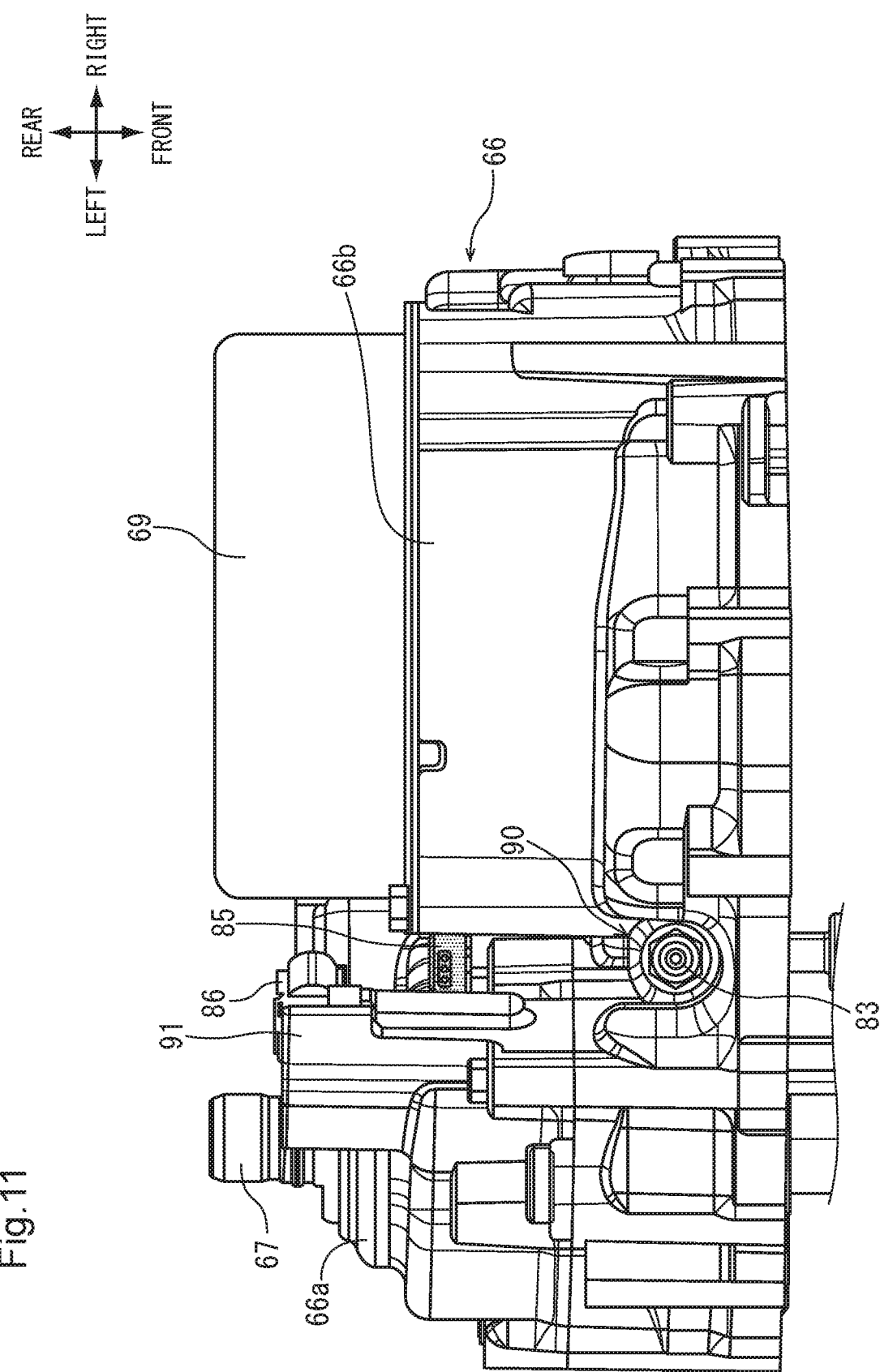
FIG. 11 is a bottom view of the transmission case.

FIG. 9 is a front view (when viewed from a rear side of the vehicle body) of the transmission case 66. Further, FIG. 10 is a perspective view of the transmission case 66. FIG. 11 is a bottom view of the transmission case 66. The rotation angle senor 85 (first sensor), the position sensor 83 (second sensor), and the shift spindle rotation angle sensor 86 (third sensor) are arranged in a concentrated manner at a lower position between the output shaft 67 and the crankshaft 60. The rotation angle senor 85 (first sensor) detects a rotation angle of the elongated shaft 84 rotated coaxially with the shift drum 75. The position sensor 83 (second sensor) is put into contact with the sensor cam 82 of the elongated shaft 84 arranged at a neutral position of the shift drum 75. The shift spindle rotation angle sensor 86 (third sensor) detects the rotation angle of the shift spindle 76.

In more detail, the transmission case 66 has a first rotary member receiving portion 66a and a second rotary member receiving portion 66b formed therein, the first rotary member receiving portion 66a having a peripheral portion provided vertically in such a way as to cover a side portion of the output shaft 67 as a first rotary member, the second rotary member receiving portion 66b having a peripheral portion provided vertically in such a way as to cover a side portion of the generator 59 as a second rotary member. The three sensors 83, 85, 86 are arranged in a concentrated manner at a lower position between the first rotary member receiving portion 66a and the second rotary member receiving portion 66b when viewed from a rear side of the vehicle body.

Further, the position sensor 83 is arranged in a receiving depressed portion 90 which opens to a lower side of the transmission case 66 at a position between the first rotary member receiving portion 66a and the second rotary member receiving portion 66b. The receiving depressed portion 90 is formed in a shape having a cylindrical side wall and a nearly circular ceiling wall, and the position sensor 83 embedded in the ceiling wall can be pulled off in an axial direction of the sensor, thereby being removed from the transmission case 66. In this way, the position sensor 83 is received in the receiving depressed portion 90 formed by the use of a dead space between the two rotary member receiving portions 66a, 66b, which can keep an excellent accessibility and can protect the position sensor 83 from moisture and jumping stones.

The three sensors are arranged in order of the position sensor 83, the rotation angle sensor 85, and the shift spindle rotation angle sensor 86 from the vehicle body front side, and the shift spindle rotation angle sensor 86 is arranged in such a way as to cover a portion of the rotation angle sensor 85. Further, the transmission case 66 has a protection rib 91 formed thereon, the protection rib 91 being provided vertically in such a way as to cover a lower surface of the shift spindle rotation angle sensor 86. In this way, among the three sensors, the lower side of the shift spindle rotation angle sensor 86 located at a position closest to the vehicle body rear side can be protected from flying stones and the like and the rotation angle sensor 85 can be protected by the shift spindle rotation angle sensor 86.

Further, the first rotary member receiving portion 66a has a second protection rib 92 formed at a position on a sensor side thereof, the second protection rib 92 being provided vertically on the vehicle body rear side along a peripheral shape of the first rotary member receiving portion 66a. In this way, the rotation angle sensor 85 and the shift spindle rotation angle sensor 86 can be protected from contact, water splash, flying stones, and grease splash of a connection portion which are caused when the rear output shaft 19 is attached to or detached from the output shaft 67.

Figure 12:
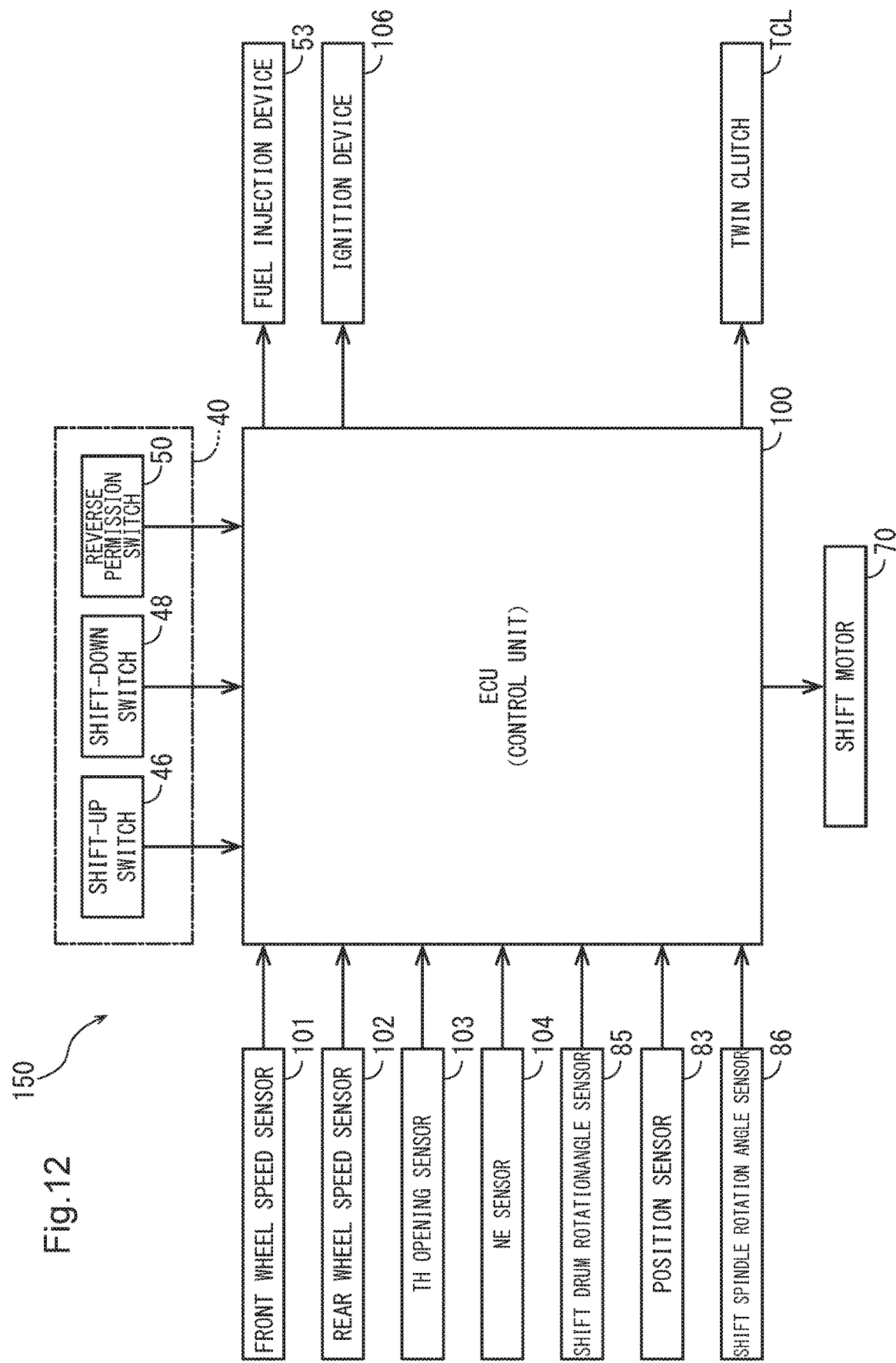
FIG. 12 is a block diagram to show a general construction of a gear position detecting device.

FIG. 12 is a block diagram to show a general construction of a gear position detecting device 150. The gear position detecting device 150 includes sensors and switches, which input information to an ECU 100 as a control device, and various kinds of devices which are driven by the ECU 100.

To the ECU 100 are inputted output signals of a front wheel speed sensor 101, a rear wheel speed sensor 102, a Th (throttle) opening sensor 103, an engine Ne (number of revolutions) sensor 104, the shift drum rotation angle sensor 85 as a first sensor, a position sensor (neutral switch) as a second sensor, and the shift spindle rotation angle sensor 86 as a third sensor. Further, to the ECU 100 are inputted output signals of the shift-up switch 46, the shift-down switch 48, and the reverse permission switch 50 which are provided on the handlebar switch 40.

The ECU 100 drives the fuel injection device 53 and an ignition device 106 on the basis of the output signals of various kinds of switches and sensors to thereby operate and control the engine E and drives the shift motor 70 and the twin clutch TCL by a hydraulic control to thereby perform a shift control.

Figure 13:
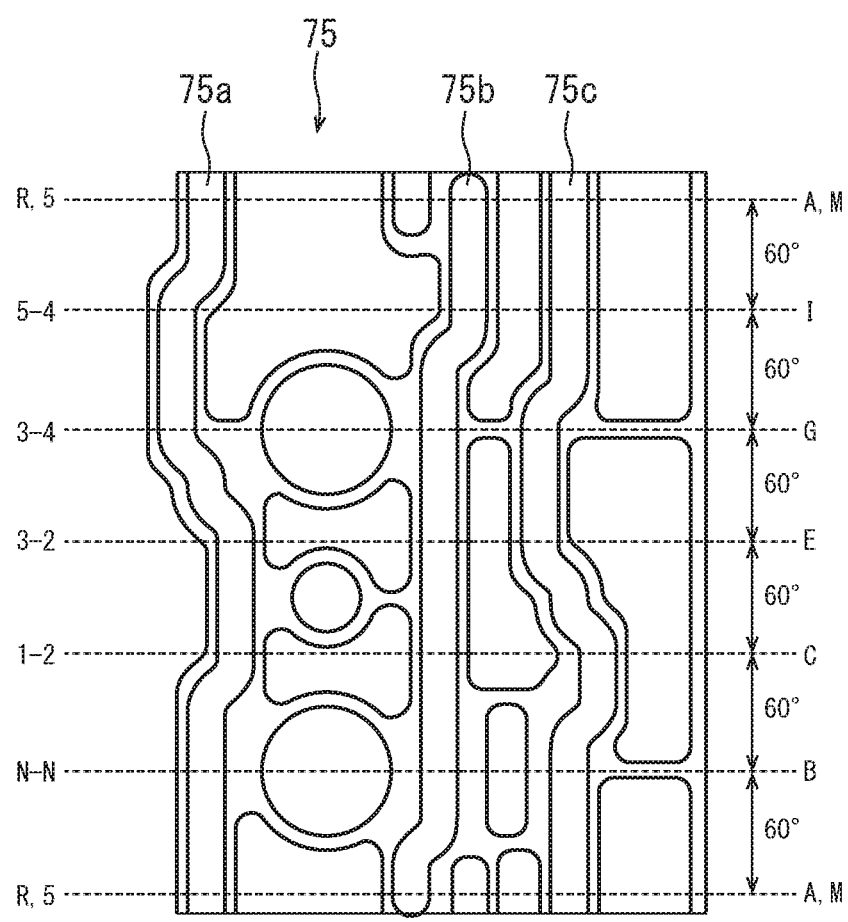
FIG. 13 is a development view of the shift drum.

FIG. 13 is a development view of the shift drum 75. Usually, a shift drum of a transmission has turn positions set thereto, the turn positions corresponding to the respective gear positions on a one-to-one basis. However, the shift drum 75 related to the present embodiment has turn positions set uniquely in combination with a combination with the twin clutch TCL which has been described above.

Specifically, the shift drum 75 has the turn positions set respectively in the following manner: a reverse gear position R(A), a neutral position N-N(B), a 1-2 position (C) corresponding to first-second gear, a 3-2 position (E) corresponding to second-third gear, a 3-4 position (G) corresponding to third-fourth gear, a 5-4 position (I) corresponding to fourth-fifth gear, and a 5 position (M) corresponding to fifth gear. This means that, for example, in a case where the shift drum 75 is at the 1-2 position (C), the shift motion between the first gear and the second gear can be performed only by switching connection states of the first clutch and the second clutch.

Then, in the present embodiment, in a sequential transmission of reverse gear position↔neutral position↔first gear position↔second gear position↔third gear position↔fourth gear position↔fifth gear position, the reverse gear position and the fifth gear position are allotted to the same rotation angle, in other words, a turn position turned from the reverse gear position by 360 degrees is set to the fifth gear, thereby setting seven specified turn positions with an interval between the respective turn positions set to 60 degrees. In this way, the number of gear positions can be increased without decreasing the interval between the gear positions, which hence makes it possible to prevent the sensors from being complicated and to detect the gear position with a high accuracy without taking special measures against variations in the sensor outputs. In this regard, the reverse gear position and the fifth gear position become the respective end positions of the turning motion on one side or the other side.

Figure 14:
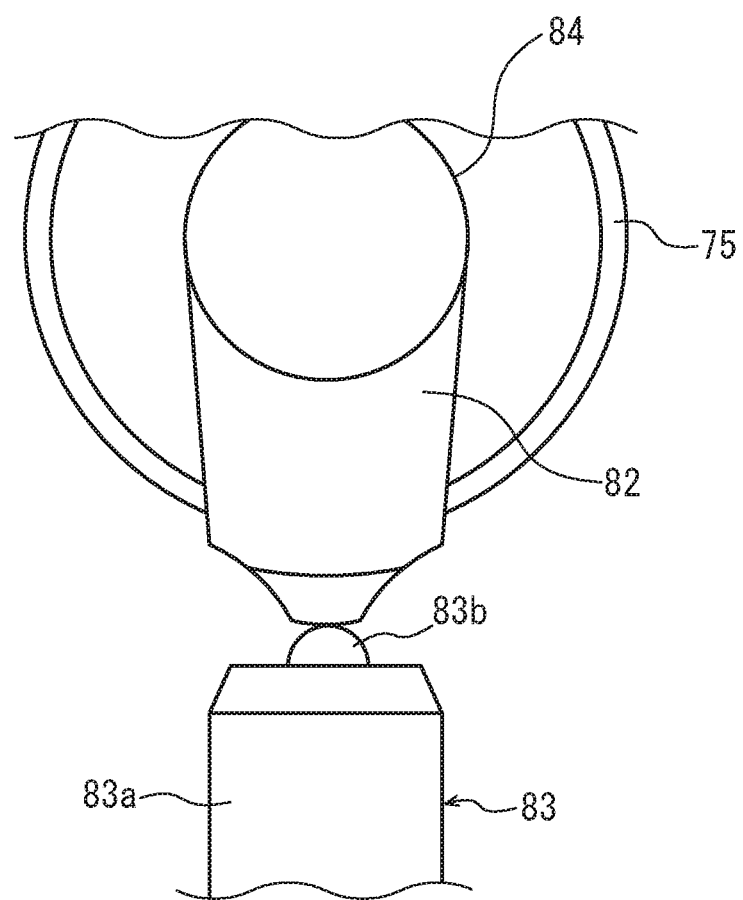
FIG. 14 is a schematic view to show an arrangement of the position sensor and the sensor cam.

FIG. 14 is a schematic view to show an arrangement of the position sensor 83 and the sensor cam 82. A main portion 83a of the position sensor 83 has a sensor protrusion 83b received therein, the sensor protrusion 83b being biased in a projection direction. When the sensor protrusion 83b is pushed into a specified position by the sensor cam 82 projected out to the outside in the radial direction from the elongated shaft 84, a sensor output of the position sensor 83 is turned on, thereby detecting that the shift drum 75 is at the neutral position. A range in which the position sensor 83 is turned on can be set, for example, to a range of five degrees forward or backward from the neutral position.

According to this construction of the position sensor 83, the present gear position can be detected in combination with the output signal of the rotation angle sensor 85 of the volume sensor in which the sensor output is increased or decreased according to the turning motion of the shift drum 75. Further, even in a case where variations are caused in the sensor output of the rotation angle sensor 85 by a product error, a detection accuracy of the gear position can be kept by performing an error-correction learning on the basis of the neutral position detected by the position sensor 83.

Meanwhile, in the present embodiment, it is necessary to make a discrimination between the reverse gear position (A) and the fifth gear position (M) which are allotted to the same turn position of the shift drum 75. Further, the rotation angle sensor 85 as the volume sensor has a dead zone in which the sensor output does not linearly increase or decrease, so it is important to determine a range of the turn position of the shift drum 75 to which the dead zone is allotted. In the following will be described a method for making a discrimination between the reverse gear position (A) and the fifth gear position (M), which are allotted to the same turn position, with a high accuracy by the use of two sensors of the rotation angle sensor 85 which has the dead zone and the position sensor 83 which detects the neutral position.

Figure 15:
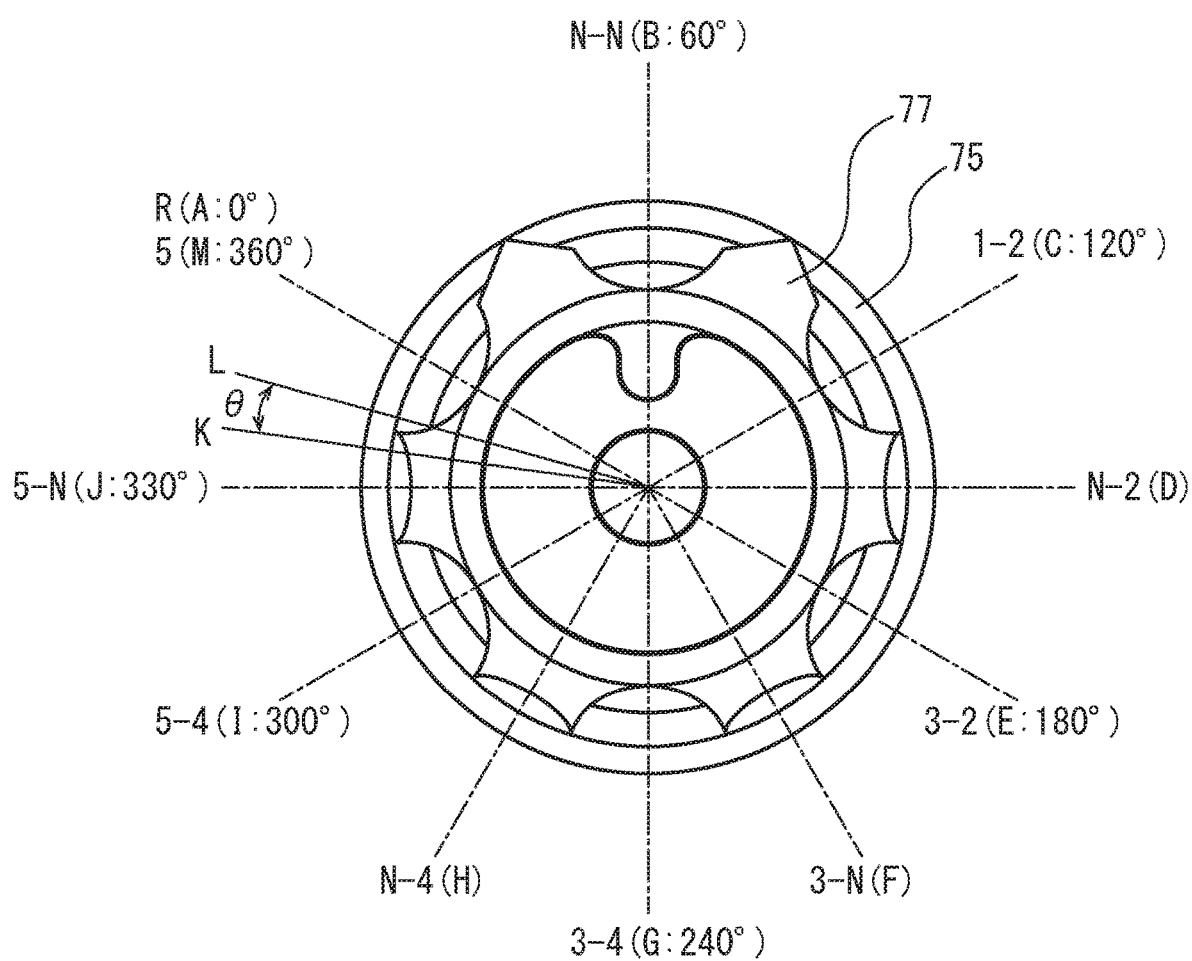
FIG. 15 is a front view of a drum center.
Figure 16:
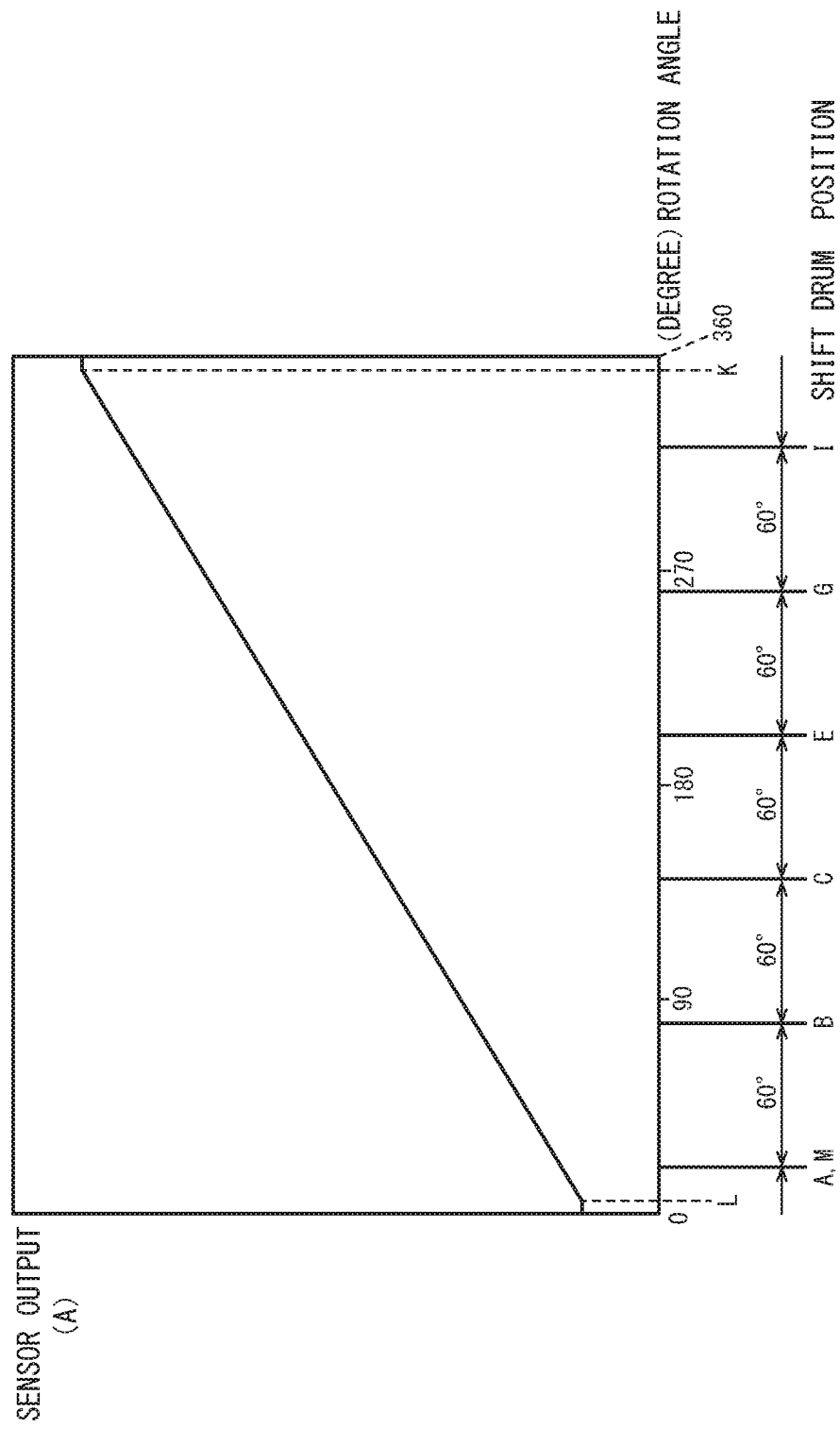
FIG. 16 is a graph to show the sensor output of the rotation angle sensor.

FIG. 15 is a front view of a drum center 77 to specify the turn angle of the shift drum 75. Further, FIG. 16 is a graph to show the sensor output of the rotation angle sensor 85. As described above, the shift drum 75 has the reverse gear position R (A), neutral position N-N (B), 1-2 position (C), 3-2 position (E), 3-4 position (G), 5-4 position (I), and 5 position (M) set respectively as specified turn positions.

In this figure, the R position (A) which is an end point of the turning motion on a shift-down side is described as a 0 degree position of the shift drum 75, whereas the 5 position (M) which is an end point of the turning motion on a shift-up side is described as a 360-degree position of the shift drum 75.

In this regard, a N-2 position (D), a 3-N position (F), a N-4 position (H), and a 5-N position (J) as half neutral positions to reduce a shift shock are set at middle positions between respective specified turn positions. Since these half neutral positions are set in this manner, for example, in a case where the shift drum 75 is turned from the 1-2 position of a specified turn position to the 3-2 position of a next specified turn position in a shift-up direction, the shift drum 75 passes the N-2 position of the half neutral position, which results in temporally decreasing a turning speed of the shift drum 75. In this way, the shift shock can be reduced and the shift motion can be performed more reliably.

Referring to FIG. 16, because of a structure of the volume sensor, the sensor output of the rotation angle sensor 85 starts to rise linearly after a rotary shaft of the rotation angle sensor 85 turns a certain angle from a base position and stops rising linearly before the rotation angle sensor 85 turns off 360 degrees from the base position. In other words, a range between K and L shown in the figure becomes a dead zone θ of the rotation angle sensor 85. An angle of the dead zone θ is set to, for example, 10 degrees.

In the present embodiment, the dead zone θ is arranged between the 5-N position (J) and the 5 position (M) (R position (A)) of the shift drum 75. In this way, the sensor output to linearly increase or decrease can be acquired at least within a range between the R position (A) and the 5-N position (J).

Figure 17:
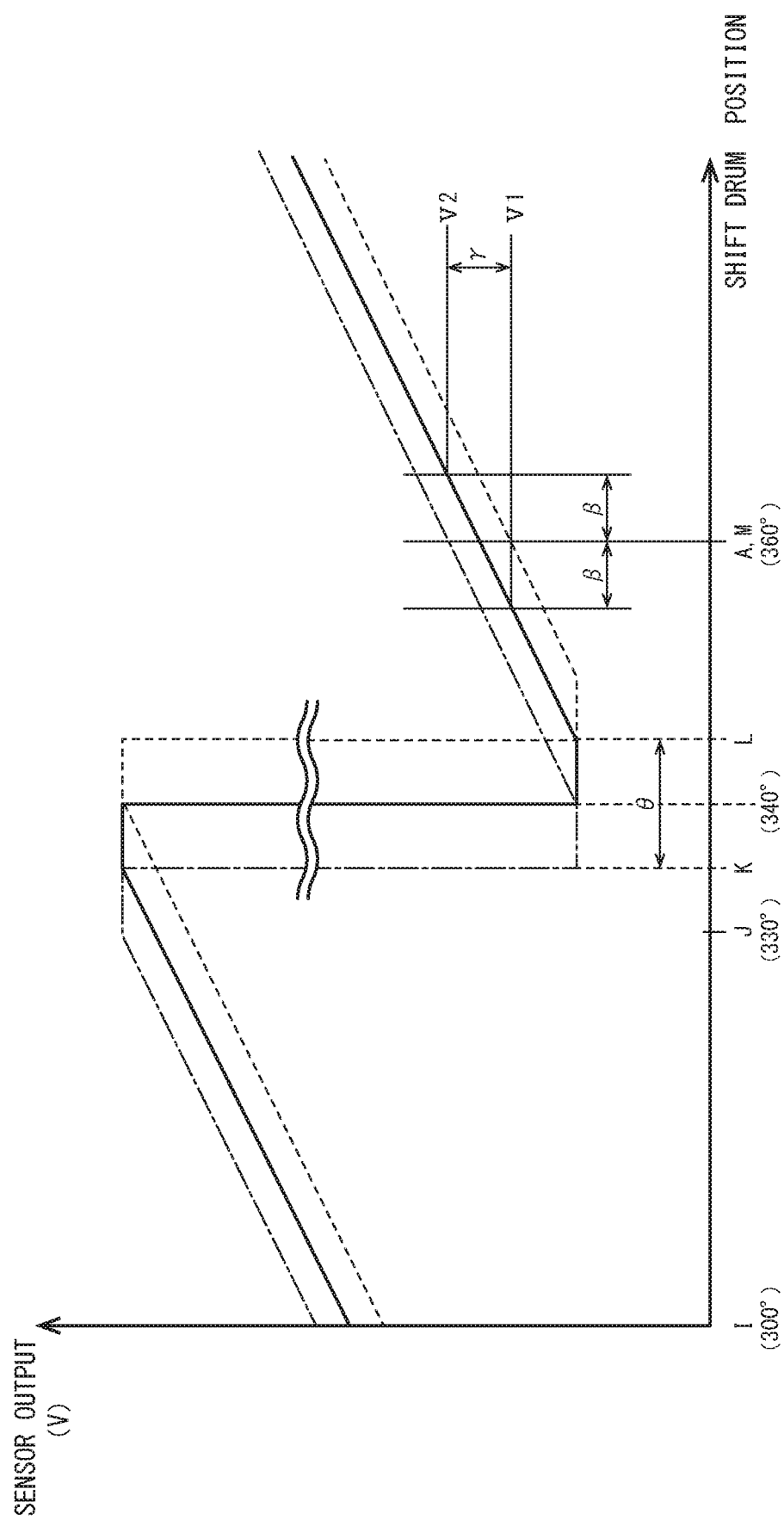
FIG. 17 is a graph to show a relationship between the dead zone of the sensor output and the position of the shift drum.

FIG. 17 is a graph to show a relationship between the dead zone θ of the sensor output and the position of the shift drum 75. In this graph, a range before and after the dead zone θ will be shown in an enlarged view. First, let's pay attention to a thick solid line to show the sensor output according to a design value in which product variations are not taken into account. The sensor output rises linearly according to a turning motion to the shift-up side of the shift drum 75 and stops rising after a K position in which a maximum voltage is outputted, and thus a linear sensor output cannot be acquired. Subsequently, the sensor output jumps down at a central portion of the dead zone θ (when a sensor rotary shaft is at 0 degree) and outputs a minimum voltage from the central portion to an L position and then starts rising linearly after the L position. This mode of the sensor output is the same also in the turning motion to the shift-down side, in other words, a linearly descending sensor output stops descending at the L position and jumps up at the central portion of the dead zone θ and then starts descending linearly from the K position.

Using the characteristics of the sensor output described above, it is possible to determine whether the shift drum 75 is at the reverse gear position (A) or at the fifth gear position (M) by the fact that the sensor output comes into a specified range γ (V1 to V2) while the sensor output is descending or by the fact that after the sensor output jumps down, the sensor output comes into the specified range γ while the sensor output is rising. In this regard, a range between sensor voltages V1 and V2, which constructs the specified range γ, can be set as a value corresponding to ±β (for example, 5 degrees) of the shift drum 75.

Further, the sensor output can cause variations due to a product error of the rotation angle sensor 85. However, according to an arrangement of the dead zone θ related to the present embodiment, even in a case where maximum variations to be assumed (for example, ±5 degrees from a center value, shown by a single dot and dash line and a broken line) are caused, the dead zone θ does not interfere with the A position (reverse gear) or the M position (fifth gear) and hence the variations do not affect the determination of whether the shift drum 75 is at the reverse gear position or at the fifth gear position. Further, the dead zone θ does not interfere with the J position (5-N), either, so the turn position of the shift drum 75 can be detected without being affected by the dead zone θ at all specified turn positions. In this regard, a relationship between the variations in the sensor output and the specified range γ is optimally corrected at a timing when the position sensor 83 is turned on first after the electric power is supplied to the ATV1.

However, the abovementioned method for making the determination of whether the shift drum 75 is at the reverse gear position (A) or at the fifth gear position (M) requires a history of the sensor output of the rotation angle sensor 85 to be stored in a memory or the like. Hence, in a case of a construction in which when the electric power of the ATV1 is turned off, the history is erased, it is considered that when the electric power is supplied to the ATV1 in a state where the shift drum 75 is at the reverse gear position (A) or at the fifth gear position (M), it is impossible to determine whether the reverse gear position (A) is selected or the fifth gear position (M) is selected.

The present embodiment employs a method in which even in a case where the electric power is turned on in a state where the history of the sensor output of the rotation angle sensor 85 is not stored, by using the sensor output of the position sensor 83 to detect the neutral position, it is possible to determine whether the shift drum 75 is at the reverse gear position (A) or at the fifth gear position (M).

Specifically, in a relationship among the neutral position (B) of the first turn position, the reverse gear position (A) of the second turn position, and the fifth gear position (M) of the third turn position, first, the neutral position (B) is set in such a way as not to overlap the dead zone θ of the rotation angle sensor 85. Next, in a case where the reverse gear position (A) located between the neutral position B and the dead zone θ and the fifth gear position (M) turned 360 degrees from the reverse gear position (A) are set to the shift drum 75, it is determined according to the output signals of the rotation angle sensor 85 and the position sensor 83 whether the shift drum 75 is at the reverse gear position (A) or at the fifth gear position (M). At this time, the gear position detecting device 150 is characterized in that when the electric power is supplied to the ATV1, the shift drum 75 is turned at least to one side and a presence or absence of the output of the position sensor 83 is detected.

In this way, in a setting to turn the shift drum 75 only to the shift-up side of one side, in a case where the shift drum 75 is at the reverse gear position (A) at the time of supplying the electric power to the ATV1, the sensor output of the rotation angle sensor 85 is turned on at a timing when the shift drum 75 is turned 60 degrees on the shift-up side, whereas in a case where the shift drum 75 is at the fifth gear position (M) at the time of supplying the electric power to the ATV1, the shift drum 75 cannot be turned more to the shift-up side, which hence makes it possible to determine whether the shift drum 75 is at the reverse gear position (A) or at the fifth gear position (M).

Further, in a setting to turn the shift drum 75 to both sides of the shift-up side and the shift-down side, in a case where the shift drum 75 is turned to the shift-down side, when the shift drum is at the fifth gear position (M), the sensor output of the rotation angle sensor 85 is turned on at a timing when the shift drum 75 is turned 270 degrees to the shift-down side, whereas in a case where the shift drum 75 is at the reverse gear position (A), the shift drum 75 cannot be turned more to the shift-down side, which hence makes it possible to determine whether the shift drum 75 is at the reverse gear position (A) or at the fifth gear position (M).

In addition, according to the above-mentioned turning motion of the shift drum 75 at the time of supplying the electric power to the ATV1, even in a case where a correction of variations in the sensor output is reset when the engine is stopped, by turning the shift motor 70 to a position in which the position sensor 83 is activated when the engine is started, the sensor output can be corrected. In this way, it is possible to detect a correct gear position immediately after the engine is started and to determine whether the shift drum 75 is at the reverse gear position (A) or at the fifth gear position (M).

Figure 18:
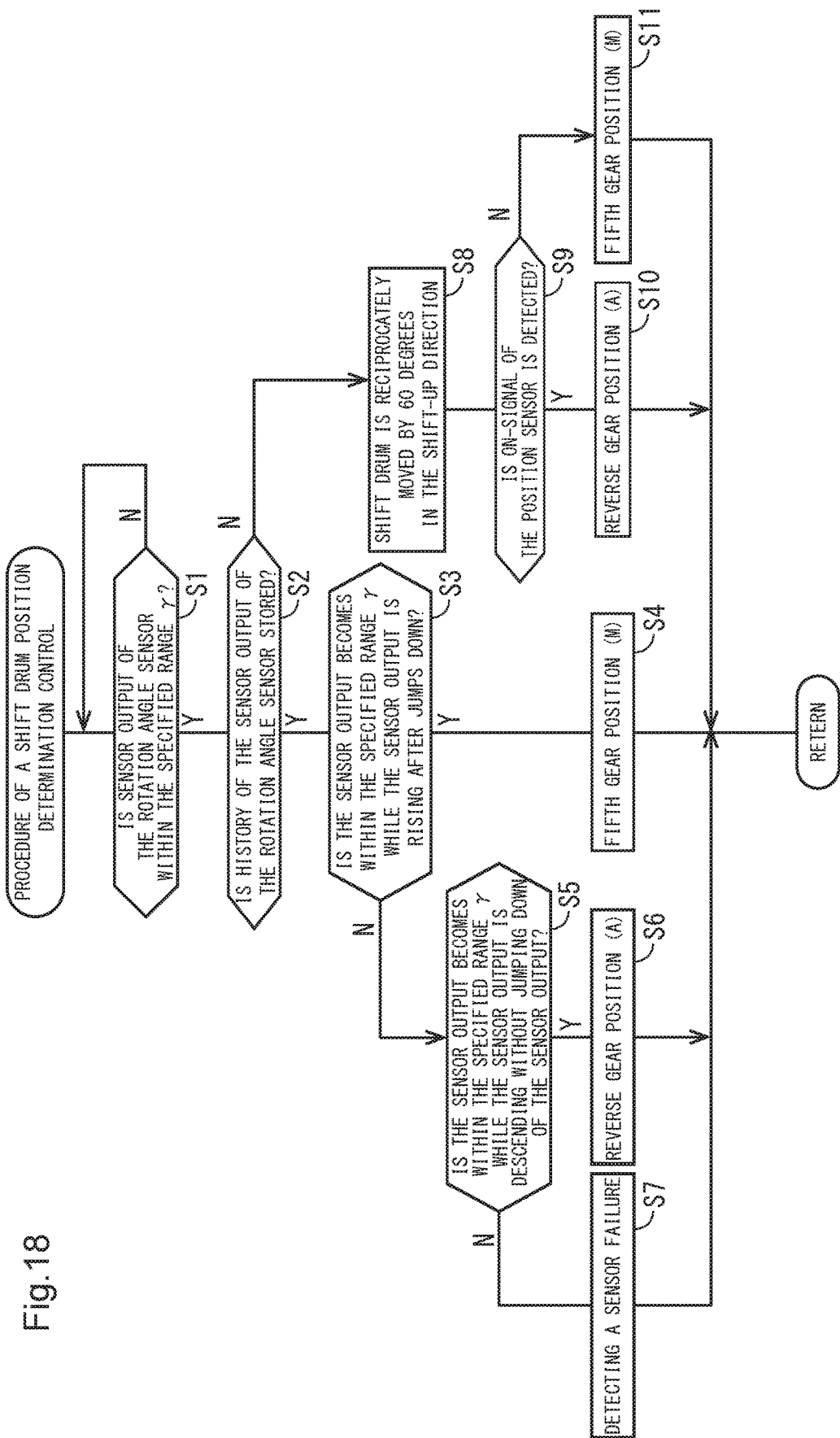
FIG. 18 is a flow chart to show a procedure of a shift drum position determination control.

FIG. 18 is a flow chart to show a procedure of a shift drum position determination control. In a step S1, it is determined whether or not the sensor output of the rotation angle sensor 85 is within the specified range γ corresponding to the reverse gear position (A) or the fifth gear position (M). Next, in a step S2, it is determined whether or not the history of the sensor output of the rotation angle sensor 85 is stored. In a case where an affirmative determination is made in the step S2, the process proceeds to a step S3 where after the sensor output jumps down, it is determined whether or not the sensor output becomes within the specified range γ while the sensor output is rising. In a case where an affirmative determination is made in the step S3, the process proceeds to a step S4 where it is determined that the shift drum 75 is at the fifth gear position (M).

Meanwhile, in a case where a negative determination is made in the step S3, the process proceeds to a step S5 where it is determined whether or not the sensor output becomes within the specified range γ while the sensor output is descending without jumping down. In a case where an affirmative determination is made in the step S5, the process proceeds to a step S6 where it is determined that the shift drum 75 is at the reverse gear position (A). In a case where a negative determination is made in the step S5, the process proceeds to a step S7 where it is determined that a failure or the like is caused in the rotation angle sensor 85, thereby detecting a sensor failure.

Further, in a case where a negative determination is made in the step S2, that is, in a case where the history of the sensor output is not stored when the ATV1 is supplied with the electric power, the process proceeds to a step S8 where a reciprocating motion to turn and return the shift drum 75 by 60 degrees in the shift-up direction is performed. In a step S9, it is determined whether or not an on-signal of the position sensor 83 of the neutral switch is detected. In a case where an affirmative determination is made in the step S9, the process proceeds to a step S10 where it is determined that the shift drum 75 is at the reverse gear position (A). Meanwhile, in a case where a negative determination is made in the step S9, in other words, in a case where even if the shift drum 75 is tried to be turned to the shift-up direction, the shift drum 75 cannot be turned because the shift drum 75 is at an end point in the shift-up direction, the on-signal of the position sensor 83 is not detected and then the process proceeds to a step S11 where it is determined that the shift drum 75 is at the fifth gear position (M). Then, a series of processes of the shift drum position determination control are finished.

In this regard, as described above, in a case where the history of the sensor output of the position sensor 83 is not stored when the ATV1 is supplied with the electric power, both of the reciprocating motion in the shift-up direction and the reciprocating motion in the shift-down direction can be performed. In a case where the shift drum 75 is turned in the shift-down direction, when the shift drum 75 is at the fifth gear position (M), the sensor output of the rotation angle sensor 85 is turned on at a timing when the shift drum 75 is turned 270 degrees, whereas when the shift drum 75 is at the reverse gear position (A), the shift drum 75 cannot be turned more to the shift-down side. In this way, it is possible to improve an accuracy of determining whether the shift drum 75 is at the fifth gear position or at the reverse gear position.

Figure 19:
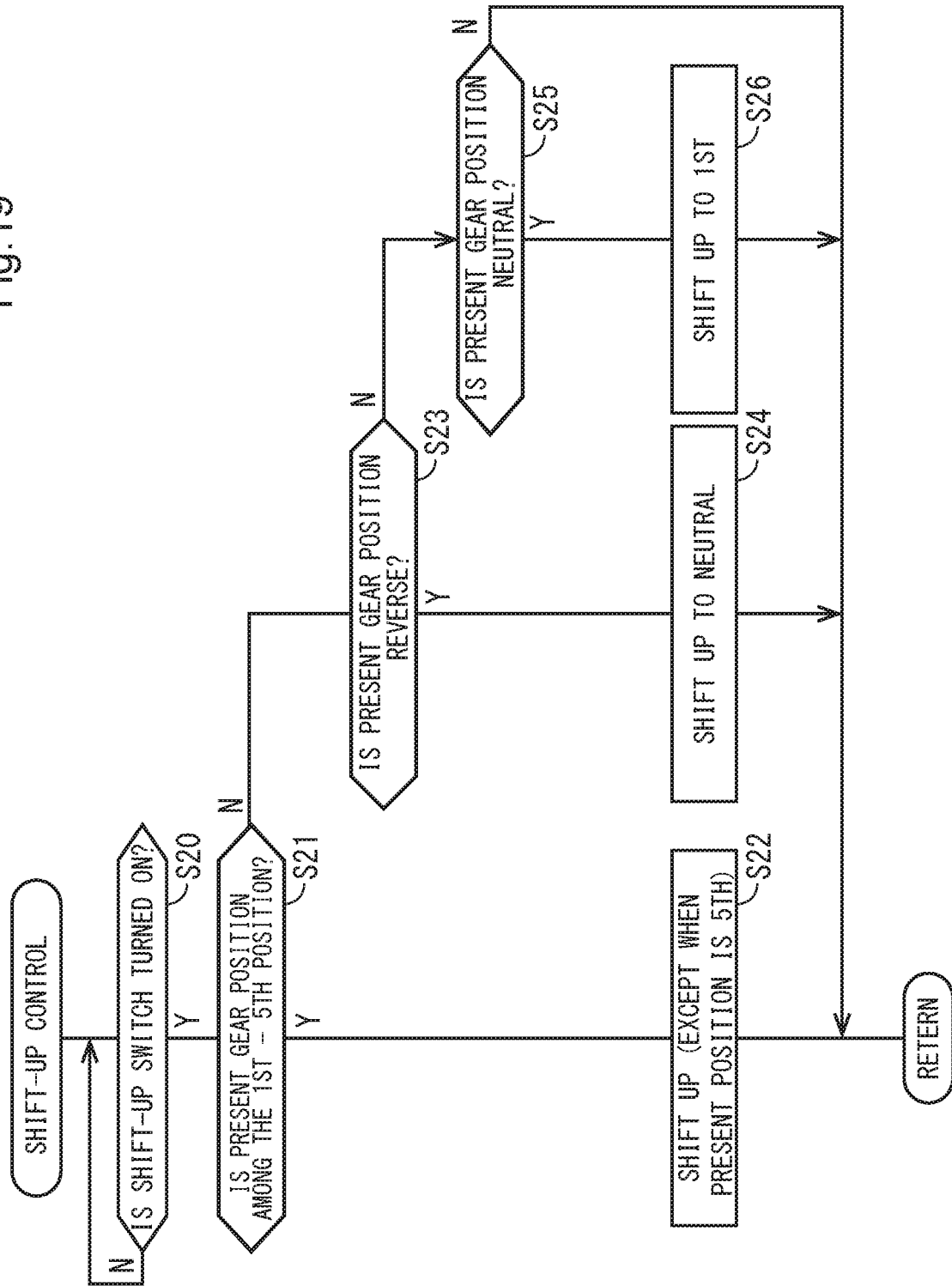
FIG. 19 is a flow chart to show a procedure of a shift-up control.
Figure 20:
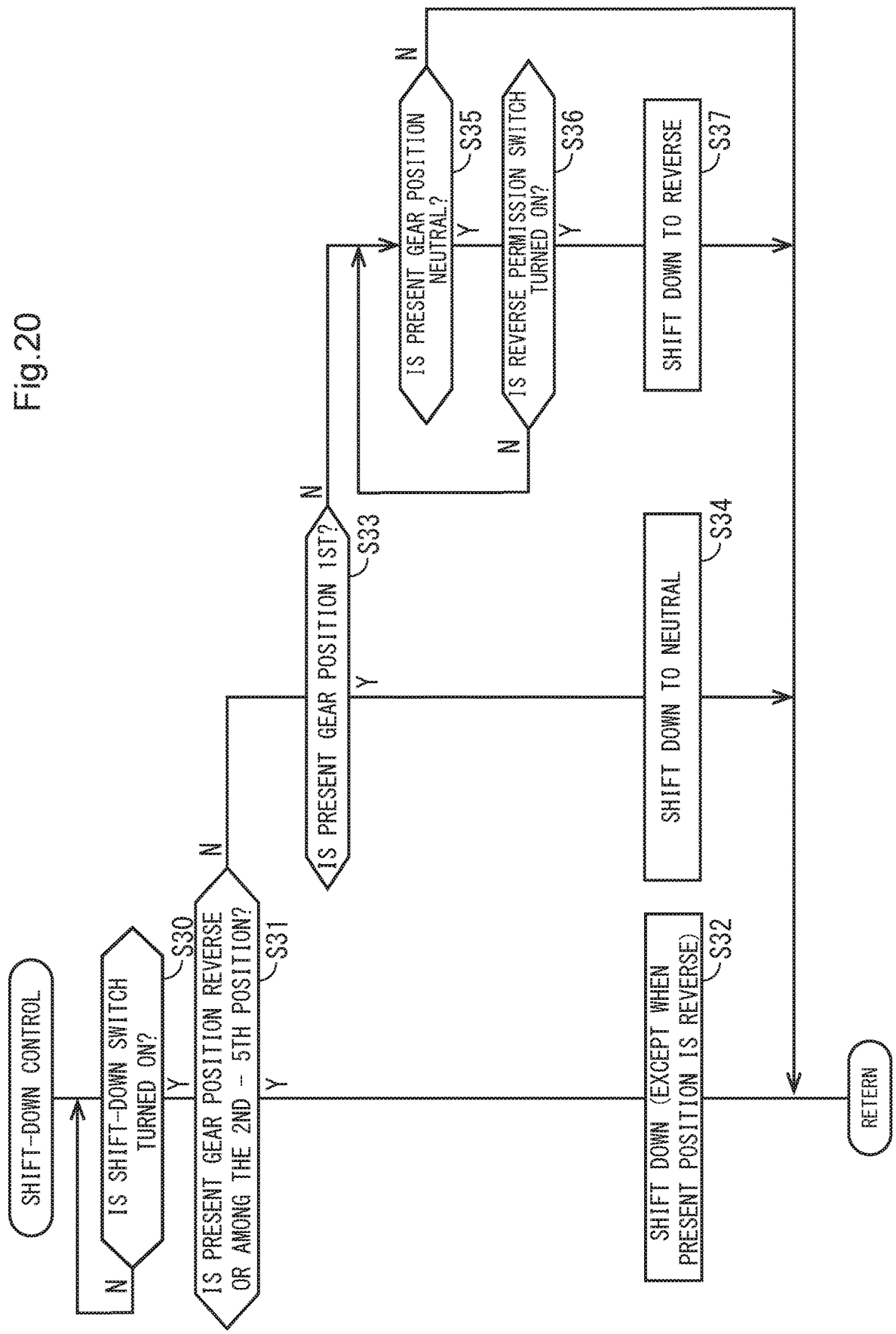
FIG. 20 is a flow chart to show a procedure of a shift-down control.

FIG. 19 is a flow chart to show a procedure of a shift-up control, whereas FIG. 20 is a flow chart to show a procedure of a shift-down control. In the following, referring to FIG. 19 and FIG. 20, a relationship between a shift operation performed by the shift-up switch 46 and the shift-down switch 48 and a function of the reverse permission switch 50 will be described.

An outline of the relationship is as follows: that is, in a case where the present gear position is among the first gear position to the fifth gear position, the shift motion is performed only by the shift-up switch 46 and the shift-down switch 48, whereas in a case where the gear position is shifted down from the neutral position to the reverse gear position, not only the shift-down switch 48 but also the reverse permission switch 50 needs to be operated.

In the shift-up control shown in FIG. 19, it is determined in a step S20 whether or not the shift-up switch 46 is turned on. In a case where an affirmative determination is made in the step S20, the process proceeds to a step S21 where it is determined whether or not the present gear position is among the first gear position to the fifth gear position. Meanwhile, in a case where a negative determination is made in the step S20, the process returns to the step S20 where it is determined that the shift-up switch 46 is turned on.

In a case where an affirmative determination is made in the step S21, the process proceeds to a step S22 where the shift drum 75 is turned in the shift-up direction to a turn position corresponding to the next gear position. At this time, in a case where the present gear position is the fifth gear position (fifth gear position), the shift drum 75 cannot be turned more in the shift-up direction and hence a drive control of the shift motor 70 is not performed.

Meanwhile, in a case where a negative determination is made in the step S21, the process proceeds to a step S23 where it is determined whether or not the present gear position is the reverse gear position. In a case where an affirmative determination is made in the step S23, the process proceeds to a step S24 where the shift drum 75 is shifted up to the neutral position.

Further, in a case where a negative determination is made in the step S23, the process proceeds to a step S25 where it is determined whether or not the present gear position is the neutral position. In a case where an affirmative determination is made in the step S25, the process proceeds to a step S26 where the shift drum 75 is shifted up to the first gear position and a series of processes of the shift-up control are finished. Meanwhile, in a case where a negative determination is made in the step S25, it is determined that the present gear position cannot be detected, that is, a sensor failure is caused and the shift-up control is finished without performing any operation.

In the shift-down control shown in FIG. 20, it is determined in a step S30 whether or not the shift-down switch 48 is turned on. In a case where an affirmative determination is made in the step S30, the process proceeds to a step S31 where it is determined whether or not the present gear position is the reverse gear position or among the second gear position to the fifth gear position. Meanwhile, in a case where a negative determination is made in the step S30, the process returns to the step S30 where it is determined whether or not the shift-down switch 48 is turned on.

In a case where an affirmative determination is made in the step S31, the process proceeds to a step S32 where the shift drum 75 is turned in the shift-down direction to a turn position corresponding to the next gear position. At this time, in a case where the present gear position is the reverse gear position (A position), the shift drum 75 cannot be turned more in the shift-down direction and hence a drive control of the shift motor 70 is not performed.

Meanwhile, in a case where a negative determination is made in the step S31, the process proceeds to a step S33 where it is determined whether or not the present gear position is the first gear position. In a case where an affirmative determination is made in the step S33, the process proceeds to a step S34 where the shift drum 75 is shifted down to the neutral position.

Further, in a case where a negative determination is made in the step S33, the process proceeds to a step S35 where it is determined whether or not the present gear position is the neutral position. In a case where an affirmative determination is made in the step S35, the process proceeds to a step S36 where it is determined whether or not the reverse permission switch 50 is turned on. Then, in a case where an affirmative determination is made in the step S36, the process proceeds to a step S37 where the shift drum 75 is shifted down to the reverse gear position and a series of processes of the shift-down control are finished. Meanwhile, in a case where a negative determination is made in the step S36, the process returns to the step S35 where it is determined whether or not the present gear position is the neutral position. Then, in a case where a negative determination is made in the step S35, it is determined that the present gear position cannot be detected, that is, a sensor failure is caused and the shift-down control is finished without performing any operation.

According to the above-mentioned function of the reverse permission switch 50, it is possible to prevent a problem such that when the driver erroneously operates the shift-down switch 48, the gear position is shifted down from the neutral position to the reverse gear position.

In this regard, in a case where a gear position is changed between the respective gear positions, a shift permission condition based on the engine speed and the vehicle speed can be added to the switching operations described above. For example, in a case where a gear position is changed between the first gear position to the fifth gear position, a shift permission condition can be added so as to avoid knocking and engine stop caused by over revolution and low revolution of the engine E. Further, in a case where a gear position is changed between the reverse gear position↔the neutral position↔the first gear position, for example, such a condition that the vehicle speed is a specified value (for example, 5 km/h) or less can be added as the shift permission condition.

Further, the above-mentioned shift permission condition can be set in the following manner: that is, in a case where the gear position is shifted down to the reverse gear position, it is not necessarily required that the shift-down switch 48 is operated while the reverse permission switch 50 is depressed, but the gear position is permitted to be shifted down to the reverse gear position according to the operation of the shift-down switch 48 until a specified time passes after the reverse permission switch 50 is released; and also in a case where the reverse permission switch 50 is depressed in a state where the shift-down switch 48 is depressed, the gear position is permitted to be shifted down to the reverse gear position. In this way, it is possible to improve convenience of the shift-down operation. Meanwhile, it is a case where the vehicle speed of the AV1 is close to zero that the reverse permission switch 50 is operated, so the above-mentioned shift permission condition can be set in such a way that in a case where it is continuously detected at a vehicle speed more than a specified value that the reverse permission switch 50 is turned on, the reverse permission switch 50 is informed of a failure of the sensor by an indicator or the like.

In this regard, a type of the engine or the multi-position transmission, a shape or a structure of the shift drum and the elongated shaft, a setting of the gear position corresponding to a turn angle of the shift drum, a structure and an arrangement of the rotation angle sensor and the position sensor, a presence or absence of the shift spindle rotation angle sensor, a structure and an arrangement of the reverse permission switch, an angle of the dead zone of the rotation angle sensor, and a mode of the memory to store the history of the sensor output of the rotation angle sensor are not limited to those in the above-mentioned embodiment but can be variously modified. An arrangement structure of the gear position detecting device and the gear position detecting sensor can be applied not only to the ATV of the four-wheel vehicle but also to various kinds of vehicles of a three-wheel vehicle, a six-wheel vehicle, and the like.

DESCRIPTION OF REFERENCE SYMBOLS

1 . . . ATV, 6 . . . steering handlebar, 40 . . . handlebar switch, 41 . . . housing, 46 . . . shift-up switch, 48 . . . shift-down switch, 50 . . . reverse permission switch, 59 . . . generator, 60 . . . crankshaft, 66 . . . transmission case, 66a . . . first rotary member receiving portion, 66b . . . second rotary member receiving portion, 67 . . . output shaft, 69 . . . recoil starter cover, 70 . . . drives the shift motor, 75 . . . shift drum, 82 . . . sensor cam, 83 . . . position sensor, 84 . . . elongated shaft, 85 . . . rotation angle sensor, 86 . . . shift spindle rotation angle sensor, 90 . . . receiving depressed portion, 91 . . . protection rib, E . . . engine, CC . . . crankcase, TM . . . multi-position transmission, TCL . . . twin clutch, SCL . . . starting clutch, R . . . gear position, A . . . reverse gear position, B . . . first turn position (neutral position N-N), C . . . 1-2 position, E . . . 3-2 position, G . . . 3-4 position, I . . . 5-4 position, M . . . 5 position

What is claimed is:

1. An arrangement structure comprising a multi-position transmission and a gear position detecting sensor configured to detect a gear position of the multi-position transmission, which gear position is shifted according to a turn motion of a shift drum,
wherein an end portion of the shift drum is fitted with a first end portion of an elongated shaft configured to be rotated coaxially with the shift drum,
the arrangement structure comprising:
a first sensor which is fitted to a second end portion of the elongated shaft and which is configured to detect a turn position of the elongated shaft; and
a second sensor which is located outside in a radial direction of the elongated shaft between the first end portion and the second end portion of the elongated shaft, and which is configured to detect that the elongated shaft is located at a specified turn position,
wherein:
the first sensor and the second sensor are fitted from the outside of a transmission case of the multi-position transmission and are exposed to the outside of the transmission case,
the transmission case has two rotary member receiving portions formed on its surface side, each of the two rotary member receiving portions having peripheral edge portions formed vertically and configured to receive a rotary member rotated in conjunction with an engine to input a driving force to the multi-position transmission,
and the second sensor is arranged in a receiving depressed portion opened to a lower side of the transmission case at a position between the two rotary member receiving portions.

2. The arrangement structure according to claim 1, wherein
the elongated shaft is fitted integrally to an end portion of the shift drum, and
a journal portion proximate to the shift drum of the elongated shaft is journaled on a crankcase side of the engine.

3. The arrangement structure according to claim 2, wherein
the first sensor is a rotation angle sensor configured to increase or decrease an output voltage according to a turn motion of the shift drum, and
the second sensor is a switch sensor which is configured to be turned on or off when the second sensor is put into contact with or brought out of contact with a sensor cam provided vertically on an outer peripheral surface of the elongated shaft.

4. The arrangement structure according to claim 2, further comprising:
a shift spindle which is arranged in parallel to the shift drum and which is configured to transmit a rotational driving force to the shift drum; and
a third sensor which is configured to be rotated coaxially with the shift spindle and to detect a rotation angle of the shift spindle,
wherein the first sensor, the second sensor, and the third sensor are arranged offset to each other in an axial direction of the shift drum.

5. The arrangement structure according to claim 2, wherein the transmission case is configured to be fitted to a surface on a vehicle body rear side of the crankcase of the engine of a saddled four wheeled vehicle.

6. The arrangement structure according to claim 1, wherein
the first sensor is a rotation angle sensor configured to increase or decrease an output voltage according to a turn motion of the shift drum, and
the second sensor is a switch sensor which is configured to be turned on or off when the second sensor is put into contact with or brought out of contact with a sensor cam provided vertically on an outer peripheral surface of the elongated shaft.

7. The arrangement structure according to claim 6, further comprising:
a shift spindle which is arranged in parallel to the shift drum and which is configured to transmit a rotational driving force to the shift drum; and
a third sensor which is configured to be rotated coaxially with the shift spindle and to detect a rotation angle of the shift spindle,
wherein the first sensor, the second sensor, and the third sensor are arranged offset to each other in an axial direction of the shift drum.

8. The arrangement structure according to claim 6, wherein the sensor cam is formed in such a way as to be offset to a shift gear in an axial direction and to overlap the shift gear in a radial direction, the shift gear constituting a component of the multi-position transmission.

9. The arrangement structure according to claim 8, wherein the transmission case is configured to be fitted to a surface on a vehicle body rear side of the crankcase of the engine of a saddled four wheeled vehicle.

10. The arrangement structure according to claim 6, wherein the transmission case is configured to be fitted to a surface on a vehicle body rear side of the crankcase of the engine of a saddled four wheeled vehicle.

11. The arrangement structure according to claim 1, further comprising:
a shift spindle which is arranged in parallel to the shift drum and which is configured to transmit a rotational driving force to the shift drum; and
a third sensor which is configured to be rotated coaxially with the shift spindle and to detect a rotation angle of the shift spindle,
wherein the first sensor, the second sensor, and the third sensor are arranged offset to each other in an axial direction of the shift drum.

12. The arrangement structure according to claim 11, wherein the transmission case has a protection rib formed vertically and configured in such a way as to cover a lower surface of the third sensor.

13. The arrangement structure according to claim 12, wherein the transmission case is configured to be fitted to a surface on a vehicle body rear side of the crankcase of the engine of a saddled four wheeled vehicle.

14. The arrangement structure according to claim 11, wherein the transmission case is configured to be fitted to a surface on a vehicle body rear side of the crankcase of the engine of a saddled four wheeled vehicle.

15. The arrangement structure according to claim 1, wherein the two rotary member receiving portions include: a first rotary member receiving portion configured to receive an output shaft of the multi-position transmission; and a second rotary member receiving portion configured to receive a generator coupled to an end portion of a crankshaft of the engine.

16. The arrangement structure according to claim 15, wherein the transmission case is configured to be fitted to a surface on a vehicle body rear side of the crankcase of the engine of a saddled four wheeled vehicle.

17. The arrangement structure according to claim 1, wherein the transmission case is configured to be fitted to a surface on a vehicle body rear side of the crankcase of the engine of a saddled four wheeled vehicle.

\* \* \* \* \*